US012645066B2

(12) United States Patent
Hocking

(10) Patent No.: US 12,645,066 B2
(45) Date of Patent: Jun. 2, 2026

(54) MEMS TENSIONING STRUCTURE COMPRISING A ZIG-ZAG OR SINE-WAVE PATTERN AND METHOD OF MANUFACTURE

(71) Applicant: Calient.AI Inc., Goleta, CA (US)

(72) Inventor: Andrew Hocking, Ithaca, NY (US)

(73) Assignee: CALIENT.AI INC., Goleta, CA (US)

( * ) Notice: Subject to any disclaimer, the term of this patent is extended or adjusted under 35 U.S.C. 154(b) by 313 days.

(21) Appl. No.: 18/468,687

(22) Filed: Sep. 16, 2023

(65) Prior Publication Data

US 2024/0094525 A1 Mar. 21, 2024

Related U.S. Application Data

(60) Provisional application No. 63/376,335, filed on Sep. 20, 2022.

(51) Int. Cl.
*G02B 26/08* (2006.01)

(52) U.S. Cl.
CPC .................................. *G02B 26/0833* (2013.01)

(58) Field of Classification Search
CPC ......................................................... B81B 3/00
See application file for complete search history.

(56) References Cited

U.S. PATENT DOCUMENTS

| | | | |
|---|---|---|---|
| 5,501,893 A | 3/1996 | Laermer et al. | |
| 6,355,554 B1 | 3/2002 | Choi et al. | |

| | | | |
|---|---|---|---|
| 6,396,711 B1 | 5/2002 | Degani et al. | |
| 7,261,826 B2 | 8/2007 | Adams et al. | |
| 2002/0011759 A1 | 1/2002 | Adams et al. | |
| 2002/0146200 A1 | 10/2002 | Kudrle et al. | |
| 2004/0061579 A1 | 4/2004 | Nelson | |
| 2004/0246306 A1 | 12/2004 | Adams et al. | |
| 2005/0045727 A1 | 3/2005 | Fu | |
| 2005/0184003 A1 | 8/2005 | Rodgers et al. | |
| 2006/0203326 A1 | 9/2006 | Fu | |
| 2007/0115529 A1 | 5/2007 | Dewa et al. | |
| 2008/0164542 A1 | 7/2008 | Yang et al. | |
| 2011/0241137 A1 | 10/2011 | Huang et al. | |
| 2012/0099176 A1* | 4/2012 | Zhou ................. | G02B 26/0841 359/290 |
| 2012/0235725 A1 | 9/2012 | Elmallah et al. | |

(Continued)

FOREIGN PATENT DOCUMENTS

| | | | | |
|---|---|---|---|---|
| CN | 107783280 B | * | 7/2020 | ........... G02B 26/105 |
| EP | 2293135 A1 | | 3/2011 | |

(Continued)

*Primary Examiner* — Paul C Lee

(74) *Attorney, Agent, or Firm* — Vitruvian IP Law LLC; Cecily Anne O'Regan; Jeong Hee Seo

(57) ABSTRACT

A microelectromechanical (MEM) device may comprise a first stage comprising a first stage reflective surface; a first frame pivotally coupled to the first stage; a second frame coupled to the first frame; and one or more of: second frame flexures positioned on the first frame and the second frame, or first stage flexures positioned on the first stage; and a tensioning structure. The tensioning structure may be coupled to the first frame to facilitate an amount of tension in one or more of the second frame flexures or the first stage flexures to prevent buckling of the one or more of the second frame flexures or the first stage flexures.

29 Claims, 19 Drawing Sheets

(56)                    References Cited

U.S. PATENT DOCUMENTS

| | | | |
|---|---|---|---|
| 2012/0286378 A1* | 11/2012 | Lee | G02B 26/0841 |
| | | | 257/E21.001 |
| 2012/0287492 A1* | 11/2012 | Lee | B81B 3/0078 |
| | | | 29/829 |
| 2013/0250532 A1 | 9/2013 | Bryzek et al. | |
| 2013/0270660 A1 | 10/2013 | Bryzek et al. | |
| 2020/0252716 A1 | 8/2020 | Pedersen et al. | |
| 2021/0396852 A1 | 12/2021 | Wang et al. | |
| 2022/0227621 A1* | 7/2022 | Miller | B81B 7/04 |

FOREIGN PATENT DOCUMENTS

| | | | |
|---|---|---|---|
| JP | 2014035429 A | * | 2/2014 |
| WO | 2024064595 A1 | | 3/2024 |

* cited by examiner

800 coupling a moveable frame to a stage with a reflective surface, and a stationary frame ⌒805 embedding one or more tensioning structures in the moveable frame to facilitate an amount of tension in one or more flexures to prevent buckling of the one or more flexures ⌒810

MEMS TENSIONING STRUCTURE COMPRISING A ZIG-ZAG OR SINE-WAVE PATTERN AND METHOD OF MANUFACTURE

CROSS-REFERENCE

This application claims the benefit of U.S. Provisional Application No. 63/376,335, filed Sep. 20, 2022, entitled MEMS TENSIONING STRUCTURES AND METHODS OF MANUFACTURE which application is incorporated herein in its entirety by reference.

BACKGROUND

A micro-electromechanical system (MEMS) device is a micro-sized mechanical structure having electrical circuitry and is fabricated using various integrated circuit (IC) fabrication methods. One type of MEMS device is a MEMS micro mirror device. Voltage may be applied between two electrodes in the micro mirror devices to control the state. Adjusting the state of the micro mirror device may control the intensity and direction of light. Micro mirror devices have various applications in video projection, microscopy, and optics.

SUMMARY

Disclosed are microelectromechanical systems (MEMS) micro mirror devices configured with various tensioning structures and methods of manufacturing the MEMS micro mirror devices.

A microelectromechanical (MEM) device may include a first stage including a first stage reflective surface; a first frame pivotally coupled to the first stage; a second frame coupled to the first frame; one or more of second frame flexures positioned on the first frame and the second frame or first stage flexures positioned on the first stage; and a tensioning structure. The tensioning structure may be coupled to the first frame to facilitate an amount of tension in one or more of the second frame flexures or the first stage flexures to prevent buckling of the one or more of the second frame flexures or the first stage flexures. The tensioning structure may include a material having a different coefficient of thermal expansion compared to one or more of the first stage or the first frame. The tensioning structure may be partially or fully embedded in the first frame. The tensioning structure may be partially or fully embedded in an edge portion of the first frame adjacent the first stage.

The tensioning structure may include a first portion on a first edge portion of the first frame and a second portion on a second edge portion of the first frame. A first distance between the first stage and one or more of the first portion or the second portion may be greater than a second distance between the third portion and the first stage. The first frame may include one or more of: one or more apertures or one or more reduced width portions configured to facilitate the amount of tension. The tensioning structure may include a plurality of segments that may be partially or fully embedded in the first frame. The tensioning structure may be substantially perpendicular to an edge of the first frame. The tensioning structure may include a plurality of segments that are spaced apart by a predetermined distance that may be substantially uniform. The tensioning structure may include one or more of a zig-zag pattern or a sine-wave pattern. A first portion of the tensioning structure may be substantially parallel to a second portion of the tensioning structure. The tensioning structure may be substantially parallel to an edge portion of the first frame. A first length of a first portion of the tensioning structure may be substantially a same length as a second length of a second portion of the tensioning structure.

A method for facilitating tension in a microelectromechanical (MEM) device may include: coupling a moveable frame to a stage with a reflective surface, and a stationary frame; and embedding one or more tensioning structures in the moveable frame to facilitate an amount of tension in one or more flexures to prevent buckling of the one or more flexures. The method may include embedding a plurality of segments in the moveable frame. The one or more tensioning structures may include one or more of a zig-zag pattern or a sine-wave pattern. The movable frame may include one or more of: one or more apertures or one or more reduced width portions configured to facilitate the amount of tension. The one or more tensioning structures may be partially or fully embedded in an edge portion of the moveable frame adjacent the stage. The one or more tensioning structures may include a first portion and a second portion. The first portion may be located at an edge portion of the moveable frame at less than a first distance to the stage and the second portion may be located at the edge portion of the moveable frame at greater than the first distance to the stage.

A method for fabricating a tensioning structure in a microelectromechanical (MEM) device may include one or more of: forming a layer of dielectric material on a first side of a substrate; forming on the first side of the substrate one or more vertical isolation trenches containing dielectric material; patterning a masking layer on a second side of the substrate that is opposite to the first side of the substrate; forming vias on the first side of the substrate; metallizing the first side of the substrate; depositing a second metal layer on the first side of the substrate to form a reflective surface; forming second trenches on the first side of the substrate to define structures; deeply etching the second side of the substrate to form narrow blades; bonding a base wafer to the second side of the substrate after forming the narrow blades; or etching through the second trenches on the first side of the substrate to release the structures and to provide electrical isolation.

The MEM device may include a first stage including a first stage reflective surface; a first frame pivotally coupled to the first stage, and a second frame coupled to the first frame; and a tensioning structure. The tensioning structure may be coupled to the first frame to facilitate an amount of tension in one or more of second frame flexures or first stage flexures to prevent buckling of the one or more of the second frame flexures or the first stage flexures. The substrate may include a silicon wafer and the dielectric material may be silicone dioxide.

Both the foregoing general description and the following detailed description are exemplary and explanatory only and are not restrictive of the disclosed implementations, as claimed.

INCORPORATION BY REFERENCE

All publications, patents, and patent applications mentioned in this specification are herein incorporated by reference to the same extent as if each individual publication, patent, or patent application was specifically and individually indicated to be incorporated by reference.

U.S. Pat. No. 5,501,893 A issued Mar. 26, 1996, to Laermer et al.,

U.S. Pat. No. 6,355,554 B1 issued Mar. 12, 2002, to Choi et al.;

U.S. Pat. No. 6,396,711 B1 issued May 28, 2002, to Degani et al.;

U.S. Pat. No. 7,261,826 B2 issued Aug. 28, 2007, to Adams, et al.;

US 2002/0011759 A1 published Jan. 31, 2002, to Adams et al.;

US 2002/0146200 A1 published Oct. 10, 2002, to Kudrle et al.;

US 2004/0061579 A1 published Apr. 1, 2004, to Nelson;

US 2005/0045727 A1 published Mar. 3, 2005, to Fu;

US 2005/0184003 A1 published Aug. 25, 2005, to Rodgers et al.;

US 2006/0203326 A1 published Sep. 14, 2006, to Fu;

US 2008/0164542 A1 published Jul. 10, 2008, to Yang et al.;

US 2011/0241137 A1 published Oct. 6, 2011, to Huang et al.;

US 2012/0235725 A1 published Sep. 20, 2012, to Elmallah et al.;

US 2013/0250532 A1 published Sep. 26, 2013, to Bryzek et al.;

US 2013/0270660 A1 Oct. 17, 2013, to Bryzek et al.;

US 2020/0252716 A1 published Aug. 6, 2020, to Pedersen et al.; and

US 2021/0396852 A1 published Dec. 23, 2021, to Wang et al.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

4

Figure 7A:
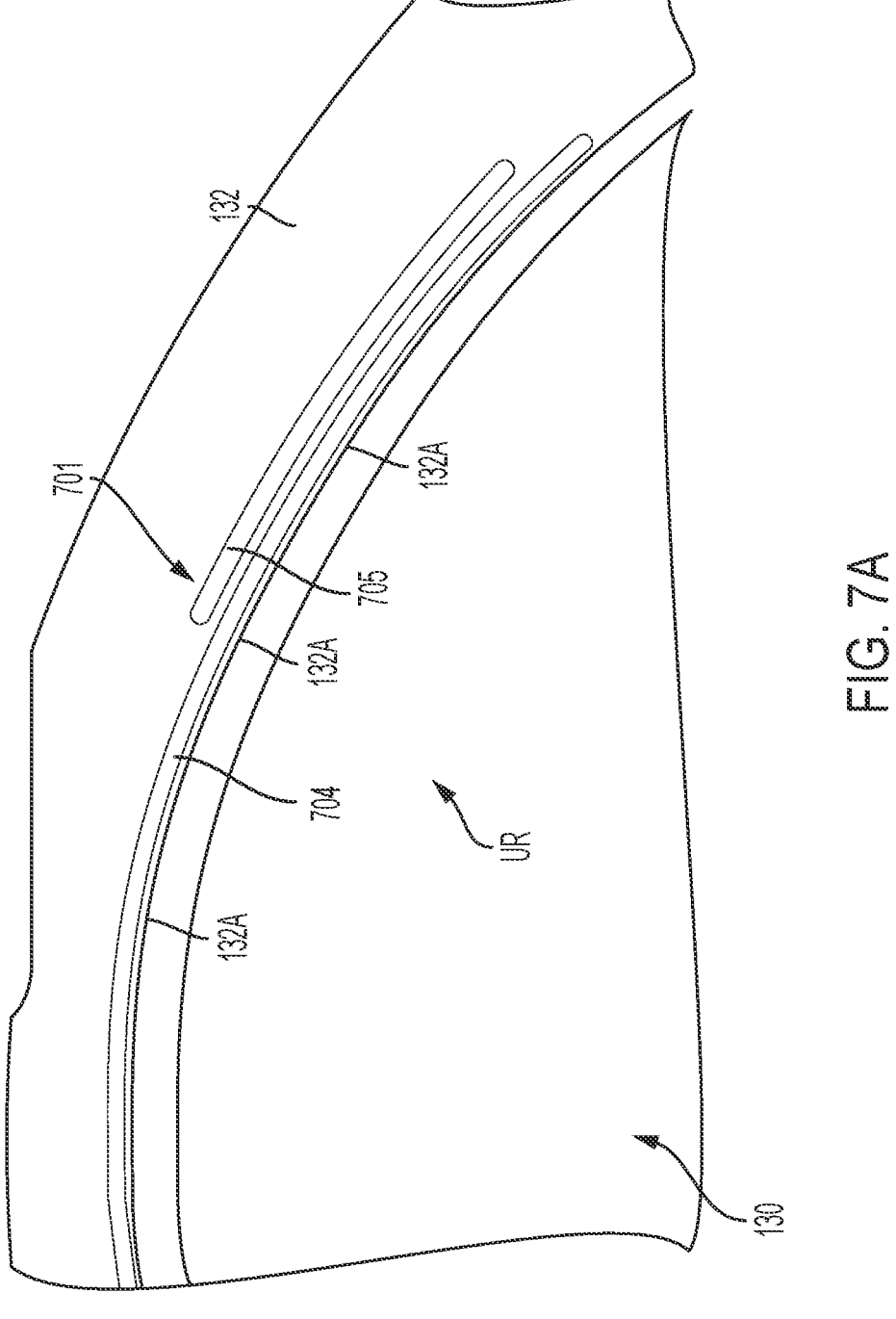
Figure 7B:
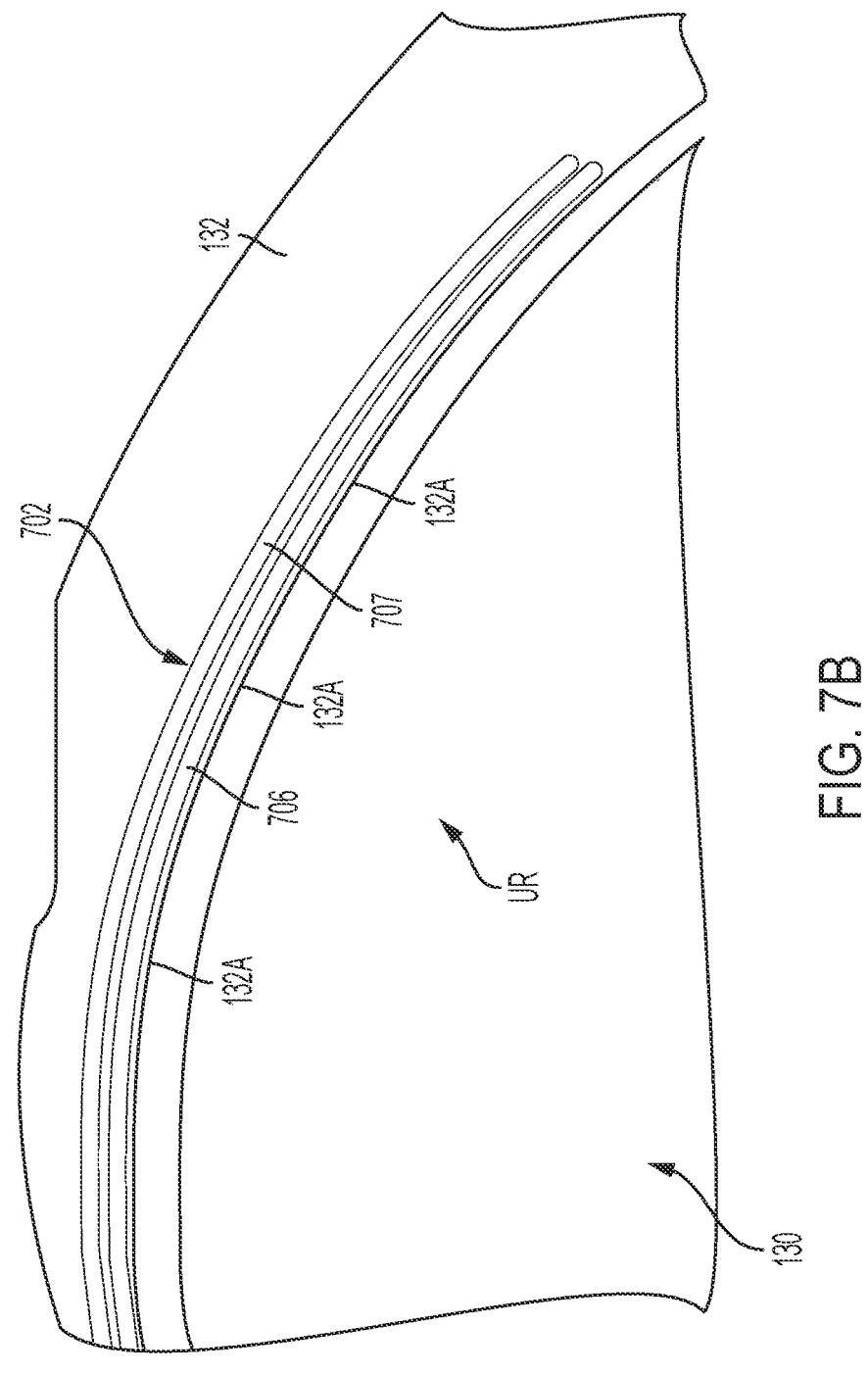
Figure 8:
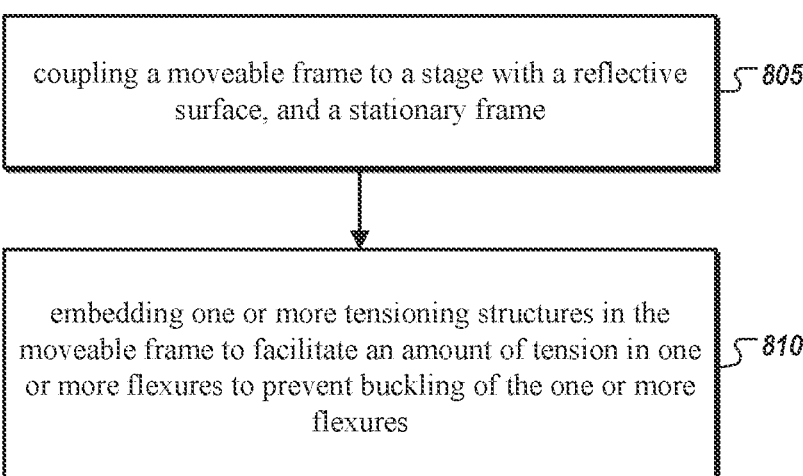

FIG. 7A illustrates a eighth tensioning structure that is embedded in a moveable frame in accordance with some implementations of the present disclosure;

FIG. 7B illustrates a ninth tensioning structure that is embedded in a moveable frame in accordance with some implementations of the present disclosure;

FIG. 8 illustrates a process flow for facilitating tension in a MEM device in accordance with some implementations of the present disclosure; and FIGS. 9A-9K illustrate a process of fabricating a tensioning structure in accordance with some implementations of the present disclosure.

DETAILED DESCRIPTION

A micro MEMS mirror device may include a stationary frame having a cavity and a mirror component in the cavity. The mirror component may include a moveable frame (which may be suspended from the stationary frame by a first stationary frame flexure and a second stationary frame flexure) and a central stage (which may be suspended from the moveable frame by a first central stage flexure and a second central stage flexure). The central stage may include a reflective surface/mirror surface. The moveable frame may be able to pivot about a first axis. The first axis may extend from the first stationary frame flexure to the second stationary frame flexure. The central stage may be able to pivot about a second axis. The second axis may extend from the first central stage flexure and the second central stage flexure. The moveable frame and the central stage may be able to pivot due to electrostatic actuation. The electrostatic actuation may generate an electric field that may cause the mirror component (e.g., movable frame, central stage) to pivot.

When the flexures (e.g., the stationary frame flexures and/or the central stage flexures) are not put into suitable tension, the flexures may be buckled and/or distorted because of compressive forces that may result when the mirror component pivots in undesirable directions due to thermal or package stress. Putting the flexures into increased tension may reduce the compressive forces and the buckling and/or distortion of the flexures, but may increase bending stiffness and therefore undesirable modes as well as increase stiffness of some of the undesirable modes, which may have the benefit of moving the resonance of the undesired modes further from the desired modes.

Therefore, MEMS micro mirror devices configured with tensioning structures that may reduce the compressive forces on the flexures while allowing for suitable tension may be useful. Furthermore, methods of manufacturing the MEMS micro mirror device may be useful.

A microelectromechanical (MEM) device may comprise a first stage including a first stage reflective surface; a first frame pivotally coupled to the first stage; and one or more of first frame flexures positioned on the first frame or first stage flexures positioned on the first stage. The tensioning structure may be coupled to the first frame to facilitate an amount of tension in one or more of the first frame flexures or the first stage flexures to prevent buckling of the one or more of the first frame flexures or the first stage flexures.

I. Microelectromechanical (MEM) Arrays

Figure 1:
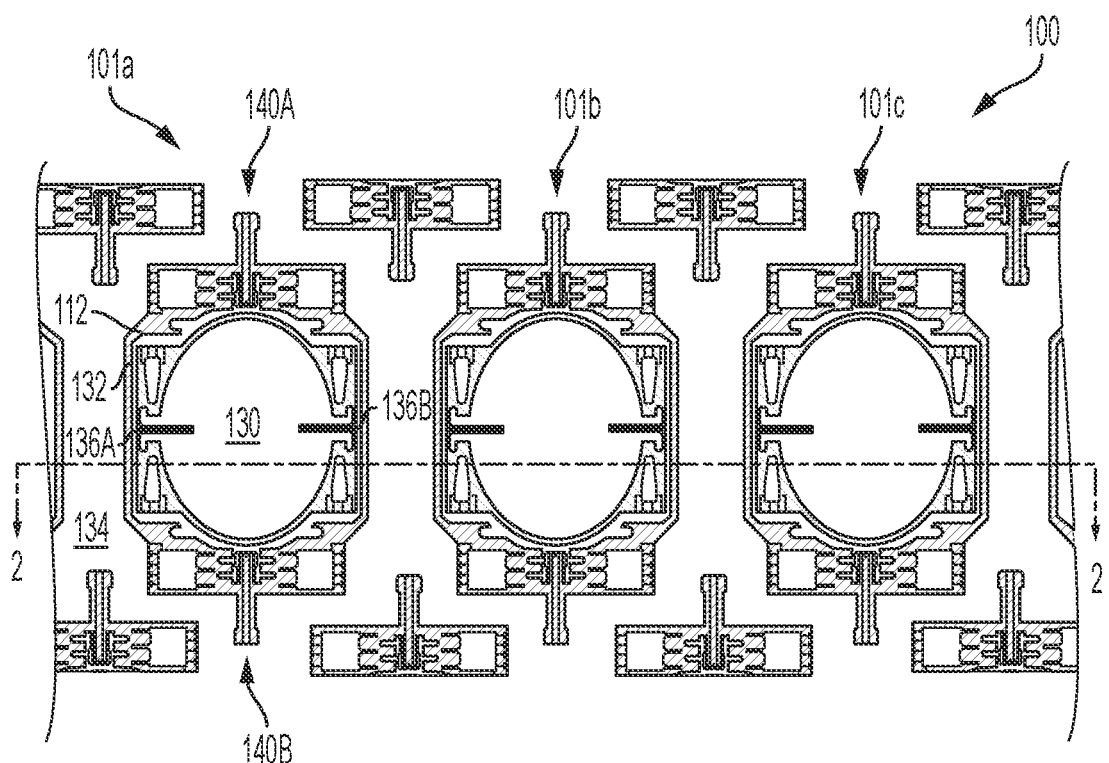
FIG. 1 illustrates an upper layer view of a portion of MEMS array including multiple MEMS micro mirror devices in accordance with some implementations of the present disclosure.

FIG. 1 illustrates an upper layer view of a portion of MEMS mirror array 100 that may include one or more MEMS micro mirror devices 101a, 101b, 101c in accordance with some implementations of the present disclosure. As shown, the MEMS mirror array 100 may include a mirror cavity 112 for the MEMS micro mirror device 101a.

The MEMS mirror array 100 may have a plurality of MEMS micro mirror devices 101a, 101b, 101c. The MEMS micro mirror device 101a in the MEMS mirror array 100 may include a central stage 130, a moveable frame 132, and a stationary frame 134. As shown, the stationary frame 134 may form the mirror cavity 112 in which the central stage 130 and the moveable frame 132 may be disposed. A reflective element or surface (e.g., mirror) may be provided that may be one or more of: (i) coupled to the central stage 130 or (ii) suspended from the moveable frame 132 by a first central stage flexure 136A (which may be referred to as a first horizontal spring) and a second central stage flexure 136B (which may be referred to as a second horizontal spring). The reflective element or surface (e.g., mirror) may be used to redirect a light beam along an optical path different from the optical path of the received light beam. The MEMS micro mirror device 101a may include a mirror (not shown) on the central stage 130 is also referred to as a "mirror cell" or a "MEMS actuator with a mirror."

The rotation of the central stage 130 may be independent of the rotation of moveable frame 132. The MEMS micro mirror device 101a may allow decoupled motion. For example, the central stage 130 may rotate with respect to stationary frame 134 while moveable frame 132 may remain parallel and stationary with respect to the stationary frame 134. In addition, moveable frame 132 may rotate with respect to the stationary frame 134 while central stage may remain parallel and stationary with respect to the moveable frame 132. The moveable frame 132 may engage the stationary frame 134 via a first stationary frame flexure 140A (which may be referred as a first vertical double spring) and a second stationary frame flexure 140B (which may be referred to as a second vertical double spring). Furthermore, the central stage 130 and the moveable frame 132 may, for example, rotate concurrently and independently of each other. The central stage 130, moveable frame 132, and stationary frame 134 may be non-parallel and decoupled with respect to each other during actuation.

The MEMS micro mirror device 101a may include a tensioning structure. Various shapes of tensioning structures may be provided that may be embedded in the moveable frame 132 to facilitate a tensioning force as described and shown in FIGS. 3A-3D, 5A-B, 6, and 7A-7B. The tensioning structures (e.g., which may be embedded in the moveable frame 132) may facilitate a tensioning force by having a structure that may expand by a different amount or at a different rate than one or more of the moveable frame 132, central stage 130, and stationary frame 134. The tensioning structures (e.g., which may be embedded in the moveable frame 132) may include material (e.g., $SiO_2$) that may have different expansion properties which may act against the moveable frame 132 (e.g., which may be formed from Si) which may cause a tensioning force on the first stationary frame flexure 140A and the second stationary frame flexure 140B (e.g., by putting the first stationary frame flexure 140A and the second stationary frame flexure 140B into tension by increasing the displacement at the ends of the first stationary frame flexure 140A and the second stationary frame flexure 140B). In addition, the tensioning structures (e.g., which may be embedded in the moveable frame 132) may act against the moveable frame 132 which may cause a tensioning force on the first central stage flexure 136A and the second central stage flexure 136B (e.g., by putting the first central stage flexure 136A and the second central stage flexure 136B into tension by increasing the displacement at the ends of the first central stage flexure 136A and the second central stage flexure 136B).

Figures 4A, 4B:
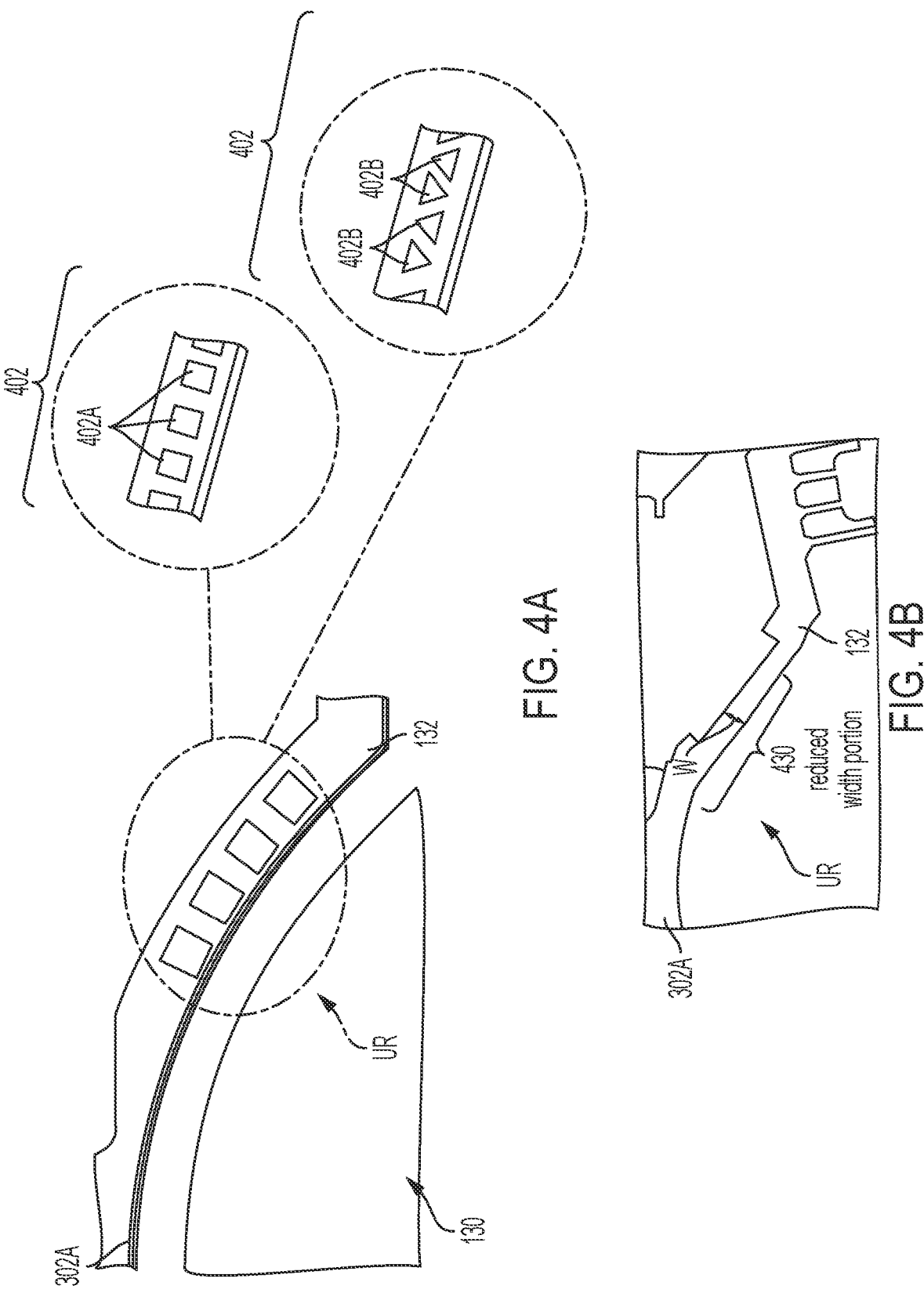
FIG. 4A illustrates a moveable frame in accordance with some implementations of the present disclosure.
FIG. 4B illustrates a moveable frame in accordance with some implementations of the present disclosure.

Various shapes (e.g., apertures 402 in the moveable frame 132 as shown in FIG. 4A, or the reduced width portion 430 shown in FIG. 4B) may be used in the moveable frame 132 to change the shape (and/or structure) of the moveable frame 132 to facilitate a tensioning force as described and shown in FIGS. 4A-B. The moveable frame 132 may use the modifications and/or the apertures 402 to be less stiff than a moveable frame 132 without the modifications and/or the apertures 402. The moveable frame 132 may use modifications (e.g., reduced width portion 430 shown in FIG. 4B) to be less stiff than a moveable frame 132 having a full width. The moveable frame 132 may use the modifications to be less stiff than a moveable frame 132 without the modifications. Accordingly, the tensioning structures in the moveable frame 132 (e.g., having a reduced stiffness) may increase displacement at the ends of the vertical double springs (e.g., first stationary frame flexure 140A, and second stationary frame flexure 140B), which may produce increased tension in the vertical double springs. The tensioning structures in the moveable frame 132 (e.g., having a reduced stiffness) may increase displacement at the ends of the horizontal springs (e.g., first central stage flexures 136A and second central stage flexures 136B), which may produce increased tension in the horizontal springs.

The tensioning structures may facilitate a tensioning force to minimize or to reduce the potential for positional distortions caused by buckling of the flexures (e.g., first central stage flexure 136A, second central stage flexure 136B, first stationary frame flexure 140A, and second stationary frame flexure 140B) when compressive force is applied.

Figure 2:
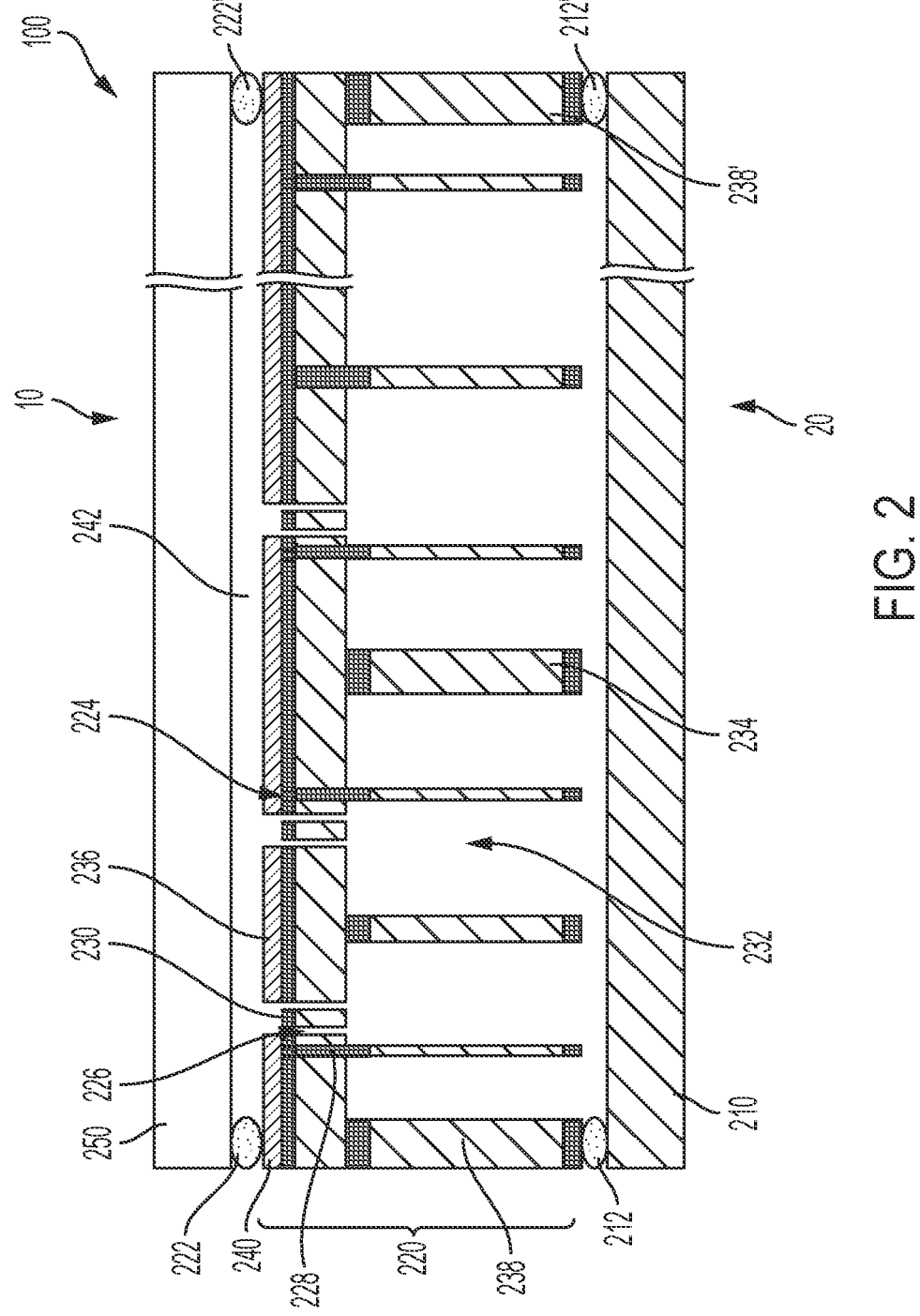
FIG. 2 illustrates a partial cross-section of the MEMS mirror array taken along the lines 2-2 in FIG. 1 in accordance with some implementations of the present disclosure.

FIG. 2 illustrates a partial cross-section of the MEMS mirror array 100 taken along the lines 2-2 in FIG. 1 with a top side 10 and a bottom side 20 where each layer within the MEMS mirror array 100 may have a layer top surface oriented towards top side 10 and a bottom surface oriented towards bottom side 20. The array may have a silicon wafer 210, which may be a base wafer for the MEMS mirror array 100, a device wafer 220 where the MEMS mirror array 100 may be fabricated, and a lid wafer 250 which may act as a protective layer. The silicon wafer 210 may be bonded to the device wafer 220 using, for example, glass frit bonding, eutectic bonding, thermo-compression bonding, fusion bonding, or anodic bonding. During the bonding process, a pair of bonding elements 212, 212' may contact the silicon member 238, 238' surrounding the MEMS mirror array 100. A second pair of bonding elements 222, 222', such as a frit glass seal, may be provided at either end of the lid wafer 250 to bond the device wafer 220 to the lid wafer 250.

Structure release may be accomplished at the upper surface (e.g., top side 10) of the device wafer 220 using dry etching. The dry etching may puncture through a plurality of trenches 226 to suspend the moveable elements of the mirror 236 (e.g., central stage 130 in FIG. 1) and the frame 230 (e.g., moveable frame 132 in FIG. 1). Isolation joints 228 may be formed by etching the front until the etch approaches or just reaches the mirror cavity 232. In addition, the release etch may promote electrical isolation by separating, for example, the silicon of the frame 230 from the silicon of surrounding members 238, 238'. The vias 224 may connect the regions of silicon to the metal interconnects 240. To seal the mirrors from the outside environment, a lid wafer 250 may be bonded to the device wafer 220, for example through the second pair of bonding elements 222, 222' which may be a frit glass seal. The lid wafer 250 may be glass to allow incoming light to be transmitted with low loss in the mirror cavity 242 above the mirror, reflect off of the upper surface of mirror 236, and transmit out of the mirror cavity 242.

II. Structural Changes to Facilitate Tension

A microelectromechanical (MEM) device 101 may comprise a first stage (e.g., central stage 130) which may comprise a first stage reflective surface (e.g., a micro mirror). The MEM device 101 may comprise a first frame (e.g., a moveable frame 132) which may be pivotally coupled to the first stage (e.g., central stage 130). The MEM device 101 may comprise one or more of: (i) one or more second frame flexures (e.g., first stationary frame flexure 140A and the second stationary frame flexure 140B) which may be positioned on the second frame (e.g., the stationary frame 134) and the first frame (e.g., the moveable frame 132) (ii) one or more first stage flexures (e.g., first central stage flexures 136A and second central stage flexures 136B) positioned on the first stage and the first frame (e.g., the moveable frame 132).

The MEM device 101 may comprise a tensioning structure that may be coupled to the first frame (e.g., moveable frame 132) to facilitate an amount of tension in one or more of the second frame flexures ((e.g., first stationary frame flexure 140A and the second stationary frame flexure 140B) or the first stage flexures (e.g., first central stage flexures 136A and second central stage flexures 136B) to prevent buckling of the one or more of the second frame flexures ((e.g., first stationary frame flexure 140A and the second stationary frame flexure 140B) or the first stage flexures (e.g., first central stage flexures 136A and second central stage flexures 136B).

The tensioning structure may comprise a material that may have a different coefficient of thermal expansion compared to one or more of the first stage (e.g., central stage 130), the first frame (e.g., moveable frame 132), or the second frame (e.g., stationary frame 134). The tensioning structure may be partially or fully embedded in the first frame (e.g., the moveable frame 132).

Figure 3A:
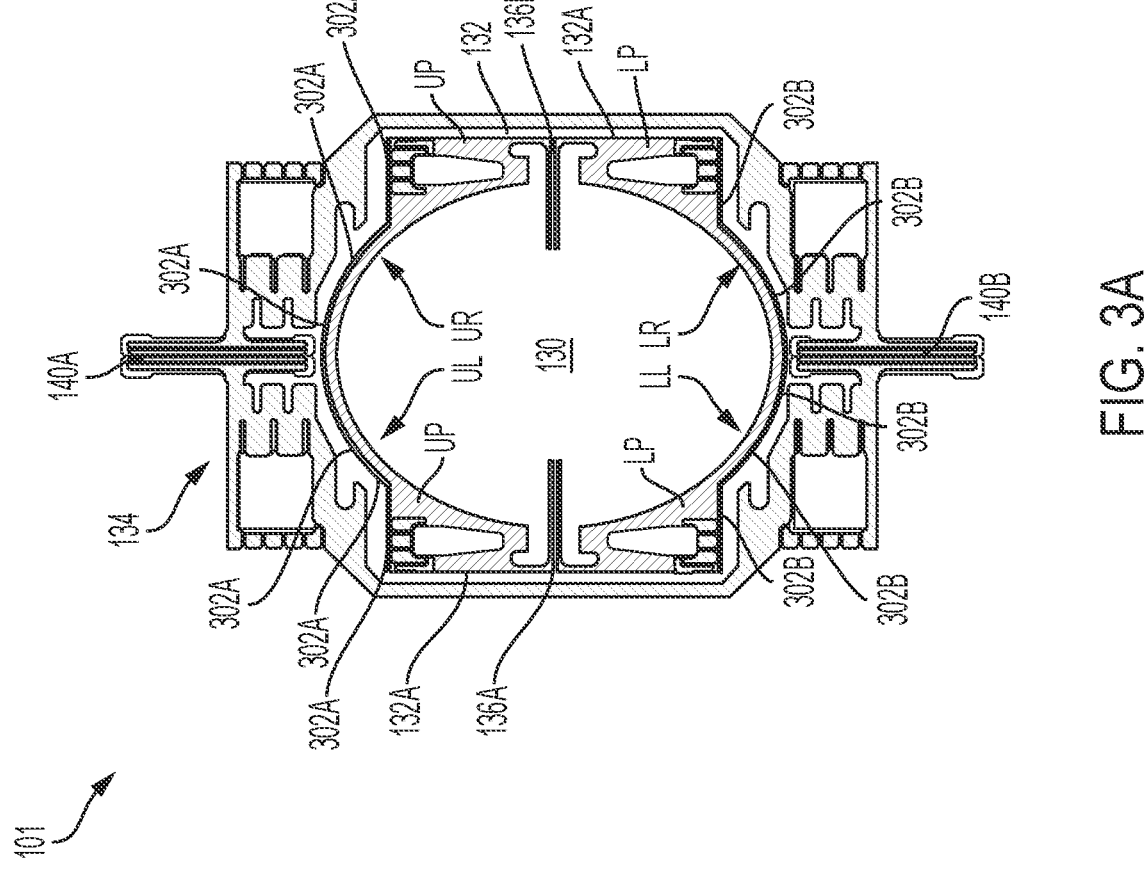
FIG. 3A and FIG. 3B illustrate a first tensioning structure and a second tensioning structure that are embedded in the moveable frame in accordance with some implementations of the present disclosure.
Figure 3B:
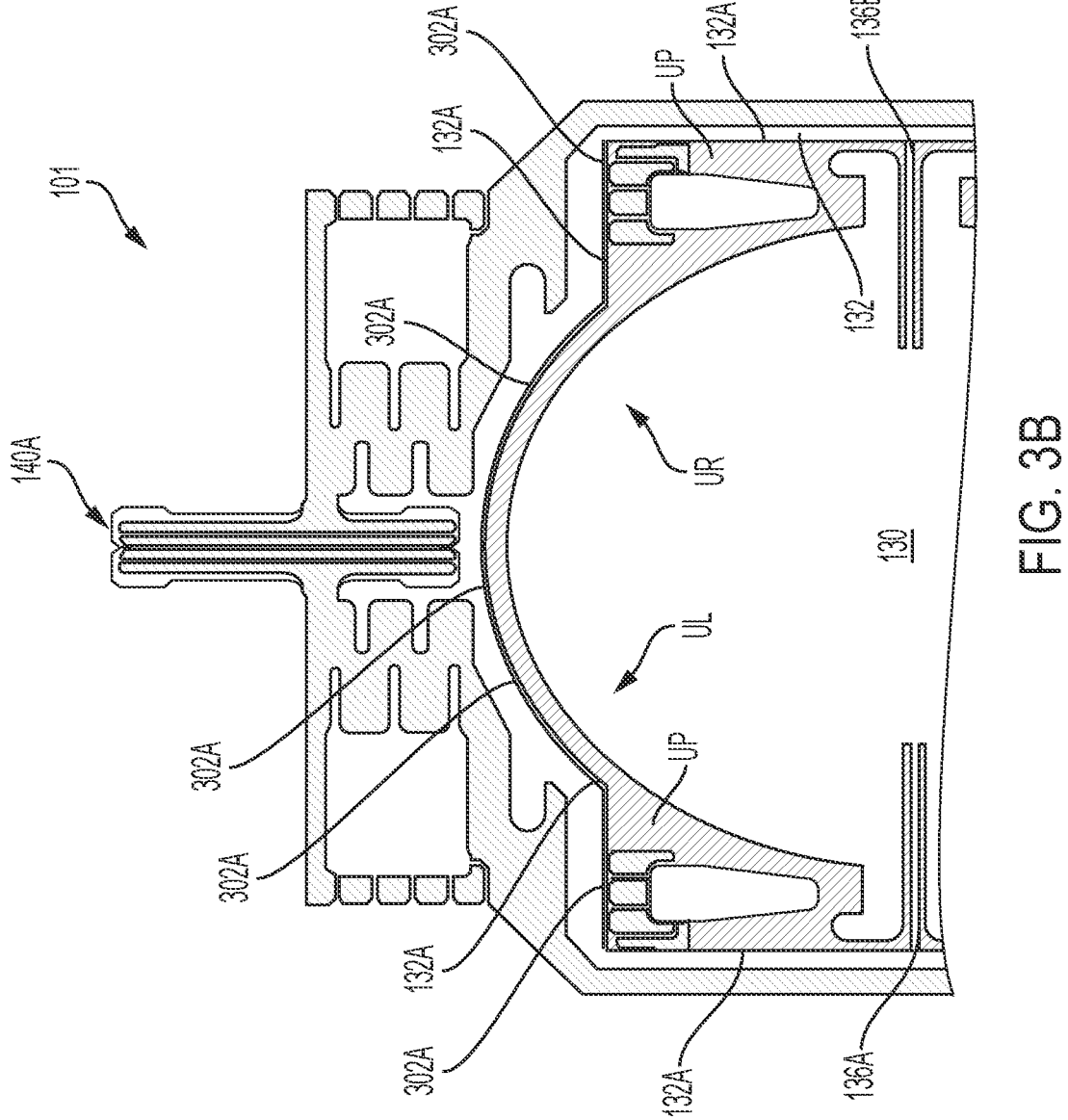
Figure 3C:
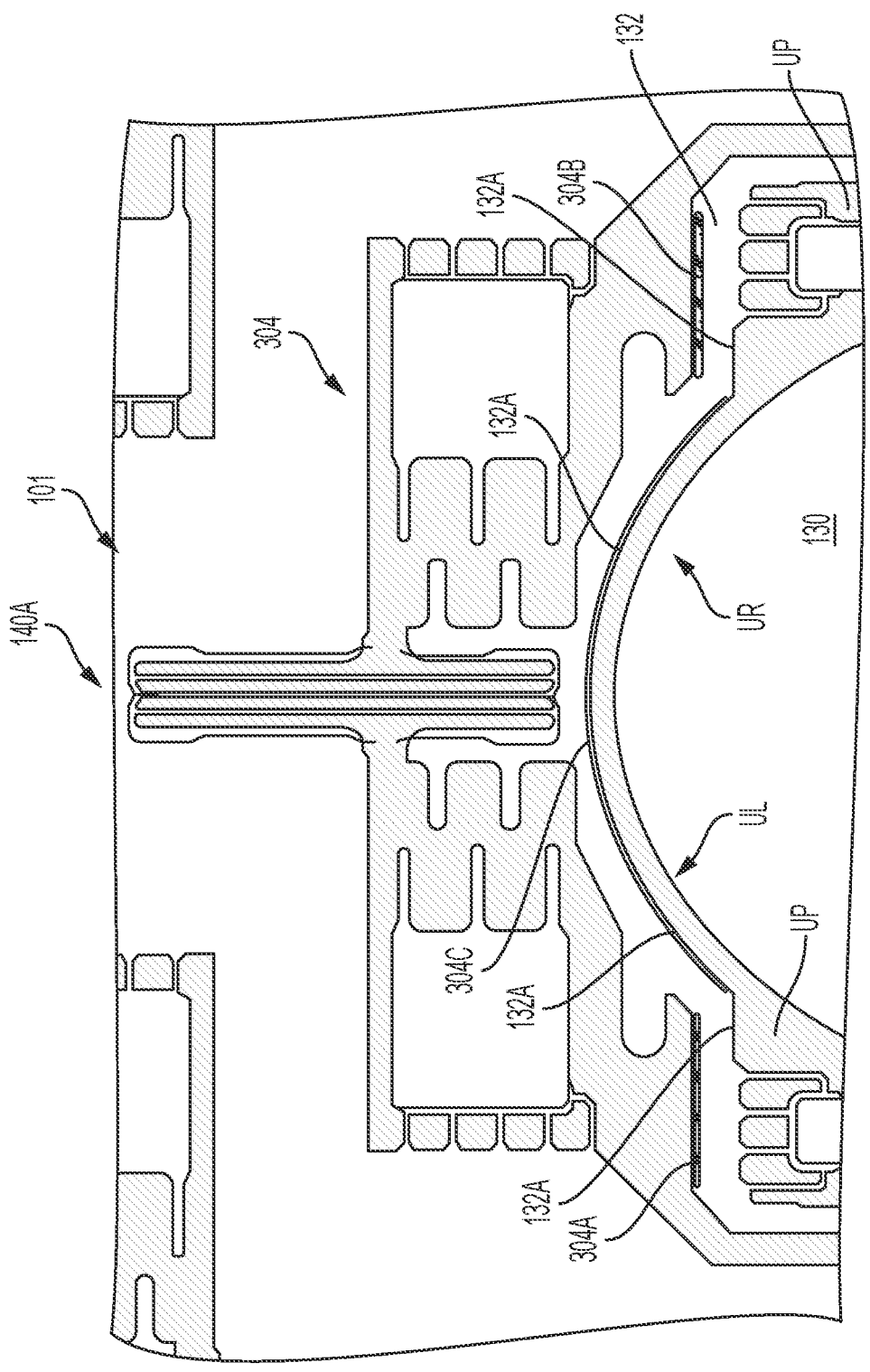
FIG. 3C and FIG. 3D illustrate a third tensioning structure and a fourth tensioning structure that are embedded in the moveable frame in accordance with some implementations of the present disclosure.
Figure 3D:
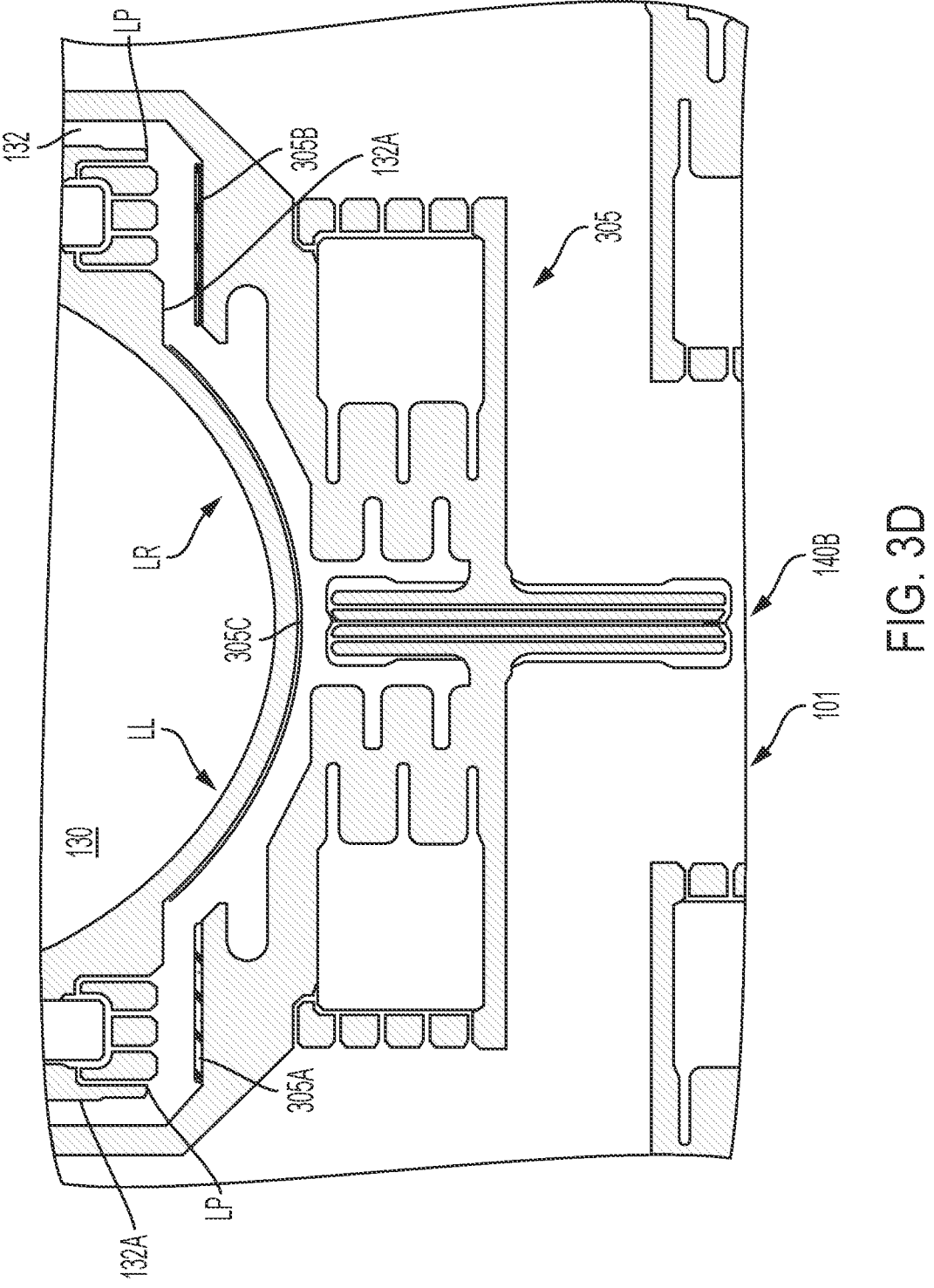

The tensioning structure may be partially or fully embedded in an edge portion e.g., an inner edge portion 132A (as illustrated in FIGS. 3A-3D, 5A-5B, 6, and 7A-7B) or an outer edge portion e.g., 304A as illustrated in FIG. 3C or 305A as illustrated in FIG. 3D or 304B as illustrated in FIG. 3C or 305B as illustrated in FIG. 3D of the first frame (e.g., the moveable frame 132) adjacent the first stage (e.g., the central stage 130). FIGS. 3A and 3B illustrate a first tensioning structure 302A (which may be referred to as an $SiO_2$ layer in a "sun hat" shape pattern trench) for an upper portion UP of the moveable frame 132 and a second tensioning structure 302B (which may be referred to as an $SiO_2$ layer in an "upside down sun hat" shape pattern trench) for a lower portion LP of the moveable frame 132 that may be embedded in the moveable frame 132 in accordance with some implementations of the present disclosure. The first tensioning structure 302A and/or the second tensioning structure 302B may be fully embedded in the moveable frame 132. The first tensioning structure 302A and/or the second tensioning structure 302B may be partially embedded in the moveable frame 132. The first tensioning structure 302A and/or the second tensioning structure 302B may include $SiO_2$ or a suitable material that may expand a different amount when compared to the expansion amount for the moveable frame 132 (e.g., which may be formed from Si).

As shown in FIGS. 3A and 3B, the first tensioning structure 302A and second tensioning structure 302B may be embedded in an inner edge portion 132A of the moveable frame 132 adjacent to the central stage 130.

The first tensioning structure 302A (which may be fully or partially embedded) and the second tensioning structure

302B (which may be fully or partially embedded) may include material (e.g., $SiO_2$) which may have different expansion properties, when compared to the expansion properties for the moveable frame 132, which may act against the moveable frame 132 to cause a tensioning force on the first stationary frame flexure 140A and the second stationary frame flexure 140B. In addition or alternatively, the first tensioning structure 302A (which may be fully or partially embedded) and the second tensioning structure 302B (which may be fully or partially embedded) may include material (e.g., $SiO_2$) which may have different expansion properties, when compared to the expansion properties for the moveable frame 132, which may act against the moveable frame 132 to cause a tensioning force on the first central stage flexure 136A and the second central stage flexure 136B.

The tensioning structure (e.g., third tensioning structure 304) may comprise one or more of: (i) a first portion (e.g., 304A as illustrated in FIG. 3C or 305A as illustrated in FIG. 3D), (ii) a second portion (e.g., 304B as illustrated in FIG. 3C or 305B as illustrated in FIG. 3D), or (iii) a third portion (e.g., 304C as illustrated in FIG. 3C or 305C as illustrated in FIG. 3D). FIG. 3C illustrates a third tensioning structure 304 which may comprise a first portion 304A (which may be referred to as an $SiO_2$ layer filled in a straight line shape trench), a second portion 304B (which may be referred to as an $SiO_2$ layer filled in a straight line shape trench), and a third portion 304C (which may be referred to as an $SiO_2$ layer in a dome shape trench) for the upper portion UP of the moveable frame 132. FIG. 3D illustrates a fourth tensioning structure 305 including a first portion 305A (which may be referred to as an $SiO_2$ layer filled in straight line shape trench), a second portion 305B (which may be referred to as an $SiO_2$ layer filled in straight line shape trench), and a third portion 305C (which may be referred to as an $SiO_2$ layer in an upside down dome shape trench) for the lower portion LP of the moveable frame 132 that may be embedded (e.g., fully or partially) in the moveable frame 132.

As illustrated, the third tensioning structure 304 and the fourth tensioning structure 305 may be fully embedded in the moveable frame 132. Alternatively or in addition, the third tensioning structure 304 and the fourth tensioning structure 305 may be partially embedded in the moveable frame 132. The third tensioning structure 304 and the fourth tensioning structure 305 may include $SiO_2$ or a suitable material that may expand a different amount when compared to the expansion amount for moveable frame 132 (e.g., which may be formed from Si).

The embedded third tensioning structure 304 and fourth tensioning structure 305, which may expand a different amount when compared to the expansion amount for one or more of the moveable frame 132, the central stage 130, or the stationary frame 134, may cause a tensioning force on the first stationary frame flexure 140A and the second stationary frame flexure 140B (e.g., by putting the first stationary frame flexure 140A and the second stationary frame flexure 140B into tension by increasing the displacement at the ends of the first stationary frame flexure 140A and the second stationary frame flexure 140B). Alternatively or in addition, the embedded third tensioning structure 304 and fourth tensioning structure 305 may cause a tensioning force on the first central stage flexure 136A and the second central stage flexure 136B (e.g., by putting the first central stage flexure 136A and the second central stage flexure 136B into tension by increasing the displacement at the ends of the first central stage flexure 136A and the second central stage flexure 136B).

A first distance between the first stage (e.g., central stage 130) and one or more of the first portion (e.g., 304A as illustrated in FIG. 3C or 305A as illustrated in FIG. 3D) or the second portion (e.g., 304B as illustrated in FIG. 3C or 305B as illustrated in FIG. 3D) may be greater than a second distance between the third portion (e.g., 304C as illustrated in FIG. 3C or 305C as illustrated in FIG. 3D) and the first stage (e.g., central stage 130). As shown in FIGS. 3C and 3D, the third portions 304C, 305C of the third tensioning structure 304 and fourth tensioning structure 305 may be embedded in the inner edge portion 132A of the moveable frame 132 adjacent to the central stage 130. The first portions 304A, 305A and/or second portions 304B, 305B of the third tensioning structure 304 and/or the fourth tensioning structure 305 may be embedded in an outer edge portion e.g., 304A as illustrated in FIG. 3C or 305A as illustrated in FIG. 3D or 304B as illustrated in FIG. 3C or 305B as illustrated in FIG. 3D, that may be away from the inner edge portion 132A of the moveable frame 132 that may be adjacent to the central stage 130. However, the first portions 304A, 305A and/or second portions 304B, 305B may be embedded in or closer to the inner edge portion 132A of the moveable frame 132 adjacent to the central stage 130 to increase tension in the first central stage flexures 136A and second central stage flexures 136B (e.g., by putting the first central stage flexure 136A and the second central stage flexure 136B into tension by increasing the displacement at the ends of the first central stage flexure 136A and the second central stage flexure 136B) and to decrease tension in the first stationary frame flexure 140A, and the second stationary frame flexure 140B (by decreasing the displacement at the ends of the first stationary frame flexure 140A and the second stationary frame flexure 140B). When the first portions 304A, 305A and/or second portions 304B, 305B are located farther away from the central stage 130, tension may be increased in the first stationary frame flexure 140A, and second stationary frame flexure 140B (e.g., from 2.2 μN to 4.0 μN) and tension may be decreased in the first central stage flexures 136A and second central stage flexures 136B (e.g., from 7.8 μN to 1.4 μN). Accordingly, the length and the location of the first portions 304A, 305A and/or the second portions 304B, 305B may be selected or adjusted to fine tune the tension on the flexures (e.g., first central stage flexures 136A and second central stage flexures 136B, first stationary frame flexures 140A, and second stationary frame flexure 140B).

The moveable frame 132 may comprise one or more of: (i) one or more apertures (e.g., 402A or 402B as illustrated in FIG. 4A) or (ii) one or more reduced width portions (e.g., reduced width portion 430 as illustrated in FIG. 4B). FIG. 4A illustrates a moveable frame 132 including the modifications (e.g., apertures 402 in the moveable frame 132) which may decrease stiffness of the moveable frame 132 in accordance with some implementations of the present disclosure. For example, the upper portion UP (e.g., as illustrated in FIGS. 3A-3C) of the moveable frame 132 (e.g., upper right portion UR, upper left portion UL) and the lower portion LP (e.g., as illustrated in FIGS. 3A and 3D) of the moveable frame 132 (e.g., lower right portion LR, lower left portion LL) may include a plurality of apertures 402 (e.g., square or rectangular openings). As shown in FIG. 4A, the moveable frame 132 may include apertures 402A that may be spaced apart from each other by a predetermined distance (e.g., which may be a predetermined distance of from about 2 microns to about 5 microns, such as 3 microns, which may be a uniformly predetermined distance between each of the apertures 402A). Alternatively or additionally, the moveable frame 132 may include apertures 402B (which may be disposed in an alternating fashion) that may be spaced apart from each other by a predetermined distance (e.g., by a predetermined distance of from about 2 microns to about 5 microns, such as 3 microns, which may be a uniformly predetermined distance between each of the apertures 402A). The apertures can be square or triangular shaped. As shown, the moveable frame 132 may include suitable trussing structures with the apertures 402 (e.g., the apertures 402A, 402B).

The moveable frame 132 may be configured with apertures 402 that may be less stiff than a moveable frame 132 without apertures 402. Accordingly, the apertures 402 in the moveable frame 132 may facilitate an increase in displacement (e.g., from 3.75 nm to 4.09 nm) at the ends of the vertical double springs (e.g., first stationary frame flexure 140A, and second stationary frame flexure 140B), which may produce increased tension (e.g., a 10% increase in displacement which may facilitate a 10% tension increase) in the vertical double spring. Likewise, the apertures 402 in the moveable frame 132 may facilitate an increase in displacement (e.g., from 5.65 nm to 7.47 nm) at the ends of the horizontal spring (e.g., first central stage flexures 136A and second central stage flexures 136B), which may produce increased tension (e.g., a 30% increase in displacement which may facilitate a 30% tension increase) in the horizontal springs (e.g., first central stage flexures 136A and second central stage flexures 136B).

FIG. 4A illustrates that the apertures 402 may have a variety of shapes including, but not limited to, square, rectangular, and triangular. Other shapes, such as circular shape, octagon shape, hexagon shape, rhombus shape, may be used without departing from the scope of the disclosure.

FIG. 4B illustrates a moveable frame 132 that may be configured with the reduced width portions 430. For example, the upper portion UP (e.g., as illustrated in FIGS. 3A-3C) of the moveable frame 132 (e.g., upper right portion UR, upper left portion UL) and the lower portion LP (as illustrated in FIGS. 3A and 3D) of the moveable frame 132 (e.g., lower right portion LR, lower left portion LL) include the reduced width portions 430. The width W of the reduced width portion 430 may be from about 15 to about 30 microns. Alternatively, or in addition, the width W of the reduced width portion 430 may be from about 5 microns to about 15 microns.

The moveable frame 132 may be configured with the reduced width portions 430 to be less stiff than a moveable frame 132 without the reduced width portions 430. Accordingly, the reduced width portions 430 may increase displacement (e.g., from 3.75 nm to 4.27 nm) at the ends of the vertical double springs (e.g., first stationary frame flexure 140A, and second stationary frame flexure 140B), which may produce increased tension (e.g., a 10% increase in displacement which may facilitate a 10% tension increase) in the vertical double springs (e.g., first stationary frame flexure 140A, and second stationary frame flexure 140B). Alternatively or in addition, the reduced width portions 430 in the moveable frame 132 may increase displacement (e.g., from 5.65 nm to 6.27 nm) at the ends of horizontal springs (e.g., first central stage flexures 136A and second central stage flexures 136B), which may facilitate increased tension (e.g., a 10% increase in displacement which may facilitate a 10% tension increase) in the horizontal springs (e.g., first central stage flexures 136A and second central stage flexures 136B).

Figure 5A:
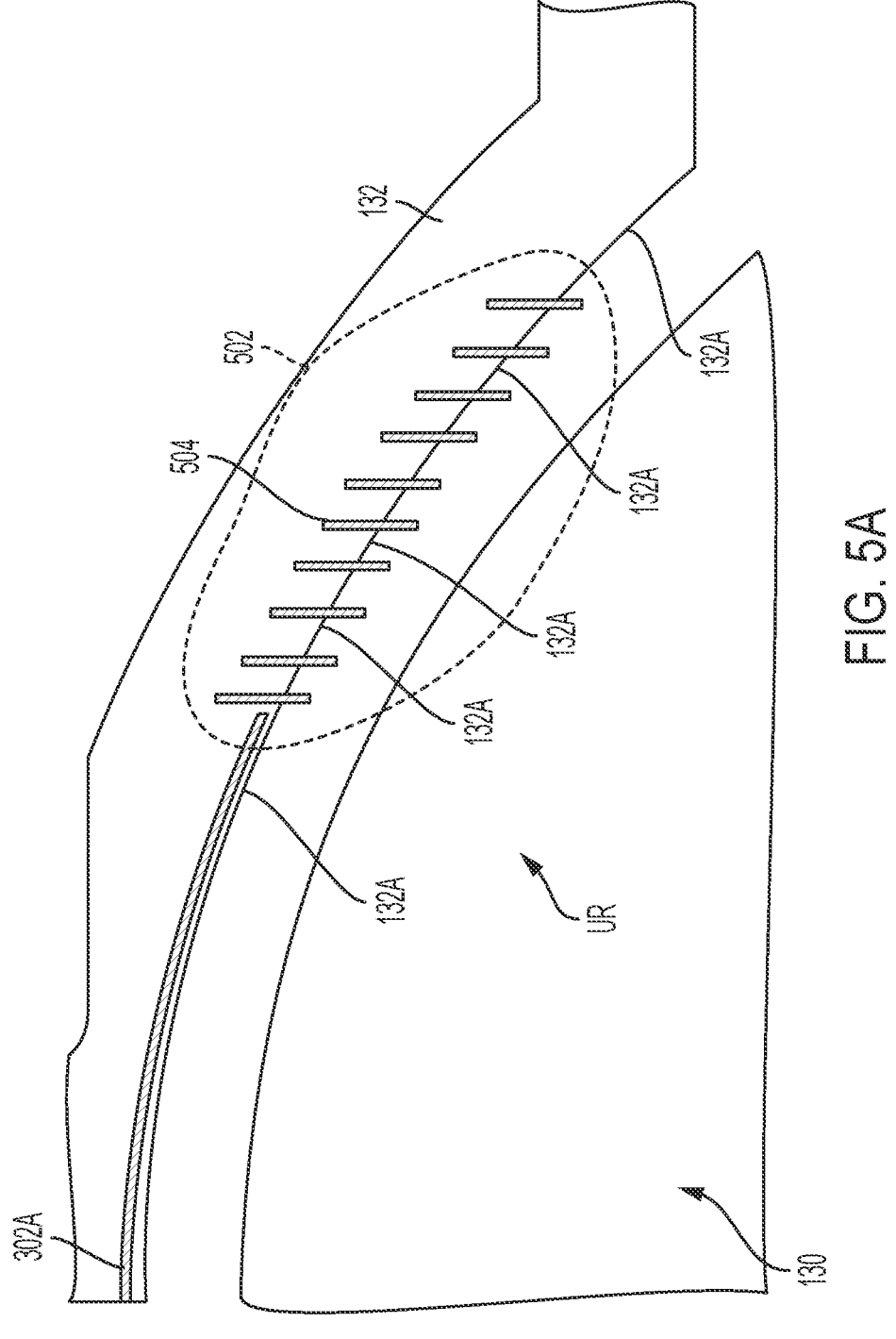
FIG. 5A illustrates a fifth tensioning structure that is embedded in a moveable frame in accordance with some implementations of the present disclosure.

As illustrated in FIG. 5A, the tensioning structure (e.g., fifth tensioning structure 502) may comprise a plurality of segments (e.g., short segments 504) that may be partially embedded in the first frame (e.g., the moveable frame 132). The plurality of segments (e.g., short segments 504) may be spaced apart by a predetermined distance that may be substantially uniform. The predetermined distance may be substantially uniform when the space between each adjoining segment of the plurality of segments differs by less than one or more of 10%, 5%, 3%, 2%, or 1% from an average space between each adjoining segment.

FIG. 5A illustrates a fifth tensioning structure 502 that may be embedded in a moveable frame 132. As shown, the fifth tensioning structure 502 may include a plurality of short segments 504. The short segments 504 may be fully embedded in the moveable frame 132 or may be partially embedded in the moveable frame 132. For example, a partially embedded short segment 504 may have about ⅔ of the short segment 504 embedded in the moveable frame 132 and about ⅓ of the short segment 504 exposed. The short segments 504 may include $SiO_2$ or a suitable material that may expand a different amount when compared to the expansion amount of one or more of the moveable frame 132, the central stage 130, or the stationary frame 134. For example, the fifth tensioning structure 502 may be disposed at the upper portion UP (e.g., as illustrated in FIGS. 3A-3C) of the moveable frame 132 (e.g., upper right portion UR, upper left portion UL) and the lower portion LP (e.g., as illustrated in FIGS. 3A and 3D) of the moveable frame 132 (e.g., lower right portion LR, lower left portion LL).

As shown in FIG. 5A, the short segments 504 may be embedded in an inner edge portion (e.g., 132A) of the moveable frame 132 adjacent to a central stage 130. The short segments 504 may be spaced apart from each other by a predetermined distance (e.g., a distance between 5 microns and 15 microns such as 10 microns), which may be a uniform distance between each of the short segments 504.

As discussed, the embedded tensioning structures (e.g., fifth tensioning structure 502), which may expand a different amount when compared to the expansion amount of one or more of the moveable frame 132, the central stage 130, or the stationary frame 134, may cause a tensioning force on the first stationary frame flexure 140A and the second stationary frame flexure 140B (e.g., by increasing the displacement at the ends of the first stationary frame flexure 140A and the second stationary frame flexure 140B). Likewise, the embedded tensioning structures (e.g., short segments 504) may cause a tensioning force on the first central stage flexure 136A and the second central stage flexure 136B (by increasing the displacement at the ends of the first central stage flexure 136A and the second central stage flexure 136B). The fifth tensioning structure 502 may cover a reduced portion of the moveable frame 132 compared to a portion of the moveable frame 132 covered by the sixth tensioning structure 506. The reduced portion covered by the fifth tensioning structure 502 may allow for a reduction in the amount of the first tensioning structure 302A in the movable frame 132.

Figure 5B:
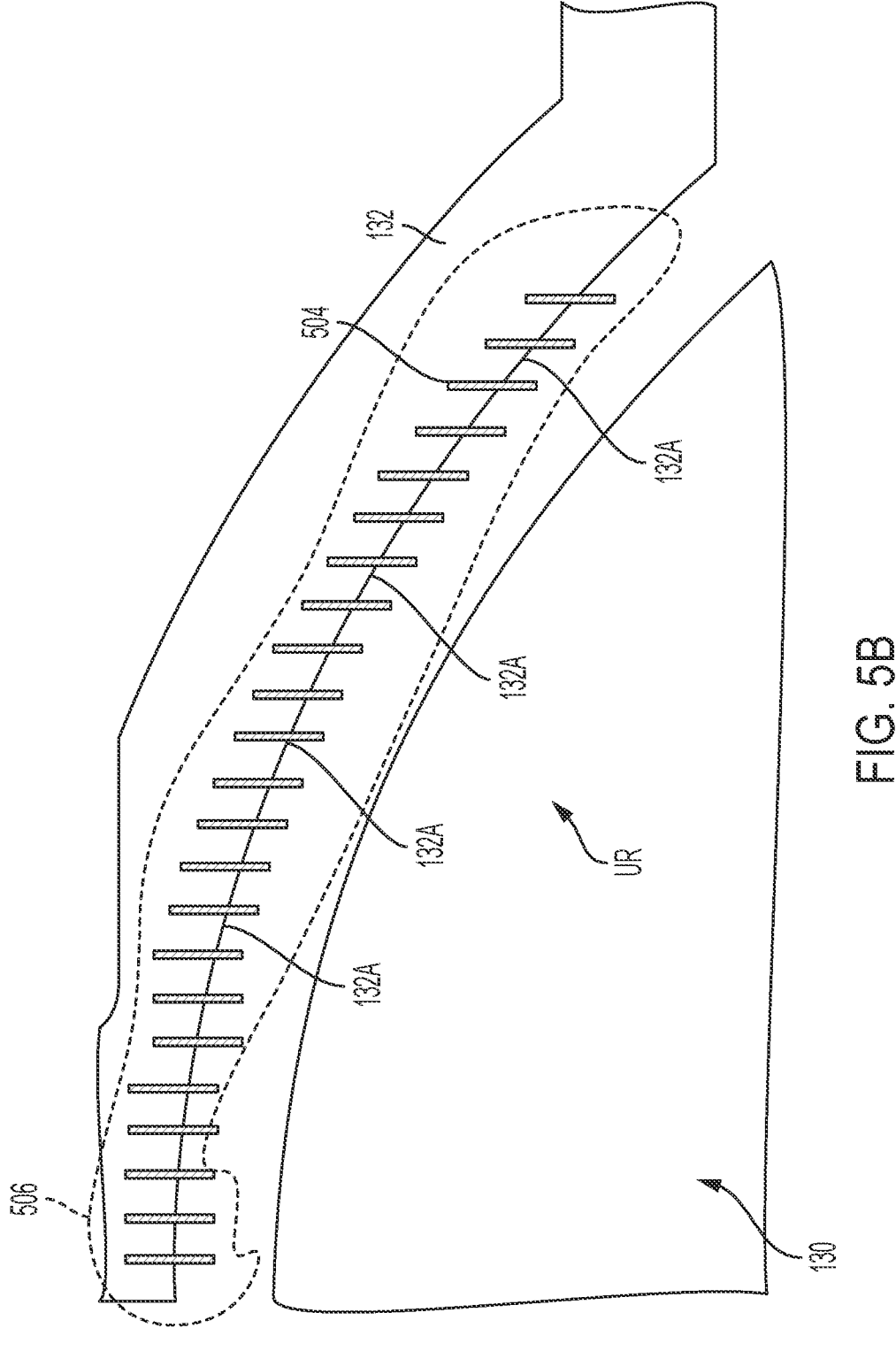
FIG. 5B illustrates a sixth tensioning structure that is embedded in a moveable frame in accordance with some implementations of the present disclosure.

FIG. 5B illustrates a sixth tensioning structure 506 that may be embedded in a moveable frame 132. The sixth tensioning structure 506 may cover a greater portion of the moveable frame 132 compared to a portion of the moveable frame 132 covered by the fifth tensioning structure 502. In one example, the sixth tensioning structure 506 may cover a substantial and/or entire arc portion of the first tensioning structure 302A. The sixth tensioning structure 506 may cover a substantial arc portion of the first tensioning structure 302A when more than one or more of 95%, 96%, 97%, 98%, or 99% of the arc portion of the first tensioning structure 302A is covered by the sixth tensioning structure 506. The greater portion covered by the sixth tensioning structure may allow for the removal of the first tensioning structure 302A in the movable frame 132.

The sixth tensioning structure 506 may include a plurality of short segments 504 which may be fully or partially embedded in the moveable frame 132. As shown in FIG. 5B, the short segments 504 may be partially embedded in the moveable frame 132. For example, about ⅔ of the short segments 504 may be embedded in the moveable frame 132 and about ⅓ of short segments 504 may be exposed. The short segments 504 may include $SiO_2$ or a suitable material that may expand a different amount when compared to the expansion amount for the moveable frame 132.

As shown in FIG. 5B, the short segments 504 may be embedded in an edge portion of the moveable frame 132 that may be adjacent to a central stage 130. The short segments 504 may be spaced apart from each other by a predetermined distance (e.g., a distance between 5 microns and 15 microns such as 10 microns), which may be a uniform distance between each of the short segments 504.

The embedded sixth tensioning structures 506, which may expand a different amount when compared to the expansion amount for one or more of the moveable frame 132, the central stage 130, or the stationary frame 134, may cause a tensioning force on the first stationary frame flexure 140A and the second stationary frame flexure 140B (e.g., by increasing the displacement at the ends of the first stationary frame flexure 140A and the second stationary frame flexure 140B). The embedded sixth tensioning structure 506 may cause a tensioning force on the first central stage flexure 136A and the second central stage flexure 136B (by increasing the displacement at the ends of the first central stage flexure 136A and the second central stage flexure 136B).

The upper portion UP (e.g., as illustrated in FIGS. 3A-3C) of the moveable frame 132 that may be adjacent to the first stationary frame flexure 140A and the lower portion LP (e.g., as illustrated in FIGS. 3A and 3D) of the moveable frame 132 that may be adjacent to the second stationary frame flexure 140B, may be configured to include the short segments 504.

Figure 6:
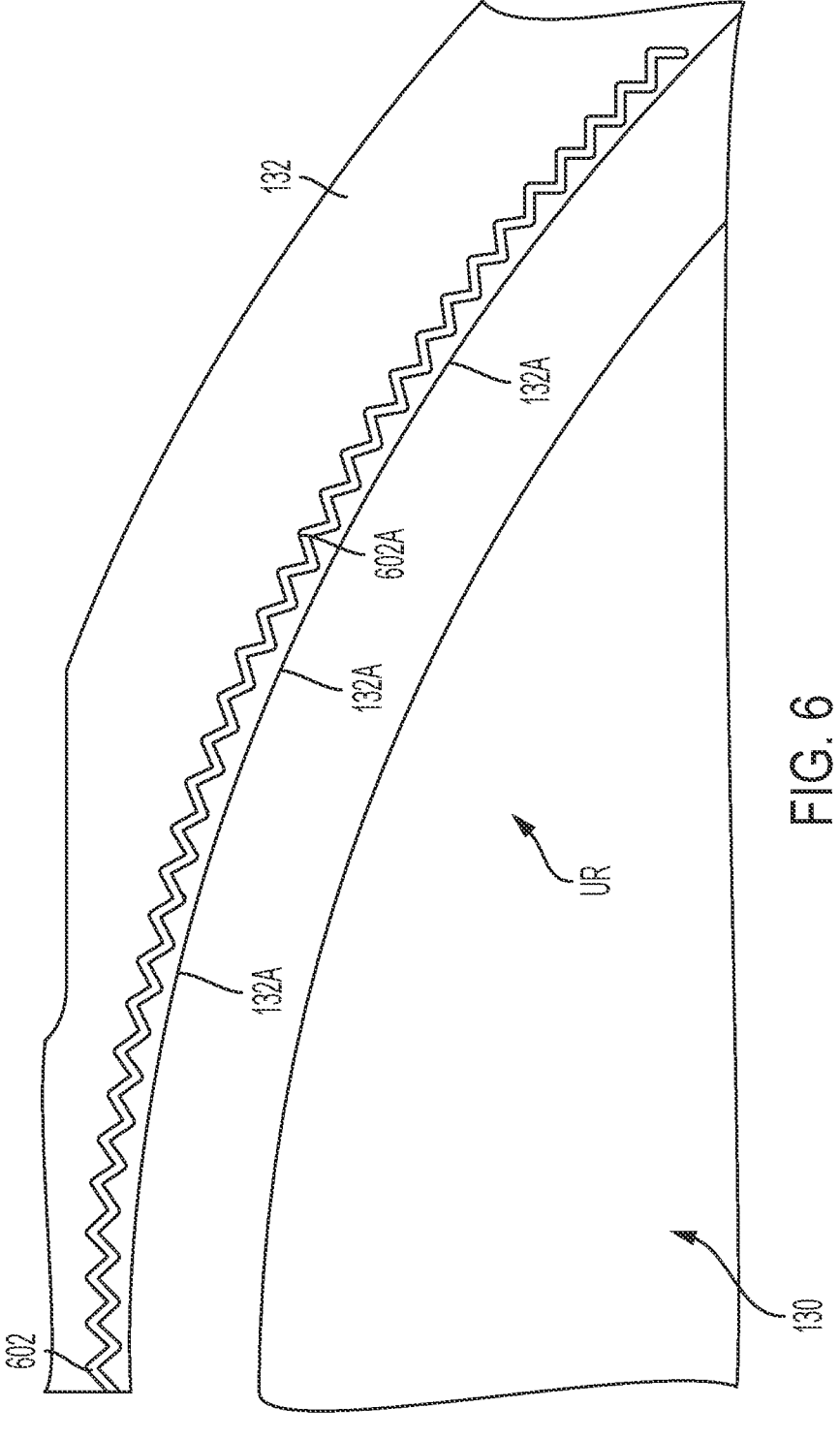
FIG. 6 illustrates a seven tensioning structure that is embedded in the moveable frame in accordance with some implementations of the present disclosure.

The tensioning structure (e.g., seventh tensioning structure 602) may comprise one or more of a zig-zag pattern or a sine wave pattern. Turning now to FIG. 6, a seventh tensioning structure 602 (also referred as a zig-zag tensioning structure having a form with abrupt alternative right and left turns) may be fully or partially embedded in the moveable frame 132. The seventh tensioning structure 602 may be configured to include an $SiO_2$ layer in a trench structure in a zig-zag pattern as shown in FIG. 6. The seventh tensioning structure 602 may be fully embedded in the moveable frame 132. The seventh tensioning structure 602 may be formed from a variety of materials including $SiO_2$ or a suitable material that may expand a different amount when compared to the expansion amount for the moveable frame 132 (e.g., formed from Si).

As shown in FIG. 6, the seventh tensioning structure 602 may be embedded in an inner edge portion 132A of the moveable frame 132 adjacent to a central stage 130. The seventh tensioning structure 602, which may expand a different amount compared to an expansion amount for one or more of the moveable frame 132, the central stage 130, or the stationary frame 134, may cause a tensioning force on the first stationary frame flexure 140A and the second stationary frame flexure 140B (e.g., by increasing the displacement at the ends of the first stationary frame flexure 140A and the second stationary frame flexure 140B). Likewise, the seventh tensioning structure 602 may cause a tensioning force on the first central stage flexure 136A and the second central stage flexure 136B (by increasing the displacement at the ends of the first central stage flexure 136A and the second central stage flexure 136B).

The upper portion UP (e.g., as illustrated in FIGS. 3A-3C) of the moveable frame 132 (upper right portion UR, upper left portion UL) and the lower portion LP (e.g., as illustrated in FIGS. 3A and 3D) of the moveable frame 132 (lower right portion LR, lower left portion LL) may include the seventh tensioning structure 602.

The seventh tensioning structure 602 in FIG. 6 may have curved ends (e.g., curved end 602A) at each of the abrupt alternative right and left turns. In addition or alternatively, the seventh tensioning structure 602 may have a radius of curvature (e.g., at each of the alternative right and left turns). For example, the curvature of the seventh tensioning structure 602 may have a radius of curvature, which may approach a pointed end based on manufacturing standards, on the exterior and interior bend, at the alternate right and left turns. In addition or in the alternative, the seventh tensioning structure 602 may have a sinewave pattern.

A first portion 704 of a tensioning structure (e.g., eighth tensioning structure 701) may be substantially parallel to a second portion 705 of an eighth tensioning structure 701. The first portion 704 and the second portion 705 may be substantially parallel to each other when the angle between the first portion 704 and the second portion 705 differs by less than one or more of 10 degrees, 5 degrees, 3 degrees, 2 degrees, or 1 degree from an angle of 0 degrees between the two members. FIG. 7A illustrates an eighth tensioning structure 701 (e.g., SiO$_2$ layer in trenches) that may include a first portion 704 and a second portion 705 that may be embedded in a moveable frame 132. As shown, the first portion 704 of the eighth tensioning structure 701 and the second portion 705 of the eighth tensioning structure 701 may be fully embedded in the moveable frame 132. Alternatively or in addition, the first portion 704 of the eighth tensioning structure 701 and the second portion 705 of the eighth tensioning structure 701 may be partially embedded in the moveable frame 132. The first portion 704 of the eighth tensioning structure 701 and the second portion 705 of the eighth tensioning structure 701 may include SiO$_2$ or a suitable material that may expand a different amount than the moveable frame 132. Additionally or alternatively, the first portion 704 and the second portion 705 may be embedded in an inner edge portion 132A of the moveable frame 132 adjacent to a central stage 130.

The eighth tensioning structure 701, which may expand a different amount compared to the expansion amount for one or more of the moveable frame 132, the central stage 130, or the stationary frame 134, may cause a tensioning force on the first stationary frame flexure 140A and the second stationary frame flexure 140B (e.g., by increasing the displacement at the ends of the first stationary frame flexure 140A and the second stationary frame flexure 140B). Likewise, the eighth tensioning structure 701 may cause a tensioning force on the first central stage flexure 136A and the second central stage flexure 136B (by increasing the displacement at the ends of the first central stage flexure 136A and the second central stage flexure 136B).

As shown, the first portion 704 and the second portion 705 of the eighth tensioning structure 701 may extend from the right side UR of the moveable frame 132 to the left side UL (as illustrated in FIGS. 3A-3C) of the moveable frame 132 while the second portion 705 of eighth tensioning structure 701 may be shorter than the first portion 704 of the eighth tensioning structure 701. As shown, a distance between the first portion 704 of the eighth tensioning structure 701 and the central stage 130 may be less than a distance between the second portion 705 of the eighth tensioning structure 701 and the central stage 130.

A first length of a first portion 706 of a ninth tensioning structure 702 may be substantially the same length as a second length of a second portion 707 of the ninth tensioning structure 702. Turning now to FIG. 7B, a ninth tensioning structure 702 (e.g., an SiO$_2$ layer in trenches) may include a first portion 706 and a second portion 707 that may be embedded in a moveable frame 132. As shown, the first portion 706 and the second portion 707 of the ninth tensioning structure 702 may be fully embedded in the moveable frame 132. Alternatively or in addition, one or more of the first portion 706 or the second portion 707 of the eighth tensioning structure 701 may be partially embedded in the moveable frame 132. For example, the first portion 706 of the ninth tensioning structure 702 may be fully embedded in the moveable frame 132 and the second portion 707 of the ninth tensioning structure 702 may be partially embedded in the moveable frame 132 and vice versa. The first portion 706 and the second portion 707 of the ninth tensioning structure 702 may include SiO$_2$ or a suitable material that may expand a different amount when compared to the expansion amount for the moveable frame 132.

As shown in FIG. 7B, the first portion 706 and the second portion 707 of the ninth tensioning structure 702 may be embedded closer to an inner edge portion 132A of the moveable frame 132 adjacent to a central stage 130.

The ninth tensioning structure 702 may expand a different amount compared to the expansion amount for one or more of the moveable frame 132, the central stage 130, and the stationary frame 134, which may cause a tensioning force on the first stationary frame flexure 140A and the second stationary frame flexure 140B (e.g., by increasing the displacement at the ends of the first stationary frame flexure 140A and the second stationary frame flexure 140B). Likewise, the embedded ninth tensioning structure 702 may cause a tensioning force on the first central stage flexure 136A and the second central stage flexure 136B frame (by increasing the displacement at the ends of the first central stage flexure 136A and the second central stage flexure 136B).

As shown, the first portion 706 and the second portion 707 of the ninth tensioning structure 702 may extend from the right side UR of the moveable frame 132 to the left side UL (as illustrated in FIGS. 3A-3C) of the moveable frame 132. The length of the first portion 706 of the ninth tensioning structure 702 and the length of the second portion 707 of the ninth tensioning structure 702 may be substantially the same as illustrated and may be positioned substantially parallel to each other. The length of the first portion 706 and the second portion 707 may be substantially the same when the total percentage difference in length between the first portion 706 and the second portion 707 is less than one or more of: 10%, 5%, 3%, 2%, or 1% of the larger portion of the first portion 706 and the second portion 707. The first portion 706 and the second portion 707 may be substantially parallel to each other when the angle between the first portion 706 and the second portion 707 differs by less than one or more of 10 degrees, 5 degrees, 3 degrees, 2 degrees, or 1 degree from an angle of 0 degrees between the two members.

FIG. 8 illustrates a process flow of an example method 800 that may be used for facilitating tension in a MEM device, in accordance with at least one example described in the present disclosure. The method 800 may be arranged in accordance with at least one example described in the present disclosure.

The method 800 may begin at block 805 where the method may comprise coupling a moveable frame to a stage with a reflective surface, and a stationary frame.

At block 810, the method may include embedding one or more tensioning structures in the moveable frame to facilitate an amount of tension in one or more flexures to prevent buckling of the one or more flexures.

The method may comprise embedding a plurality of segments in the moveable frame. The tensioning structure may comprise one or more of a zig-zag pattern or a sine-wave pattern. The moveable frame may comprise one or more of: one or more apertures or one or more reduced width portions. The tensioning structure may be partially or fully embedded in an edge portion of the first frame adjacent the first stage. The tensioning structure may comprise a first portion, a second portion, and a third portion.

Modifications, additions, or omissions may be made to the method 800 without departing from the scope of the present disclosure. For example, in some examples, the method 800 may include any number of other components that may not be explicitly illustrated or described.

III. Methods of Manufacture

The methods for fabricating a MEM array (e.g., MEMS mirror array 100 in FIG. 1) may comprise forming a layer of dielectric material on a first side of a substrate; forming on the first side of the substrate vertical isolation trenches containing dielectric material; patterning a masking layer on a second side of the substrate that is opposite to the first side of the substrate; forming vias on the first side of the substrate; metallizing the first side of the substrate; depositing a second metal layer on the first side of the substrate to form a reflective surface; forming second trenches on the first side of the substrate to define structures; deeply etching the second side of the substrate to form narrow blades; bonding a base wafer (e.g., silicon wafer 210 in FIG. 2) to the second side of the substrate after forming the narrow blades; and etching through the second trenches on the first side of the substrate to release the structures and to provide electrical isolation.

The MEM device may comprise one or more of: a first stage including a first stage reflective surface, a first frame pivotally coupled to the first stage, and a second frame coupled to the first frame, or a tensioning structure coupled to the first frame. The tensioning structure may be coupled to the first frame to facilitate an amount of tension in one or more of second frame flexures or first stage flexures to prevent buckling of the one or more of the second frame flexures or the first stage flexures.

The substrate may comprise a silicon wafer. Alternatively or in addition, the dielectric material may be silicon dioxide. Alternatively or in addition, the method may include one or more of forming a passivation dielectric layer on the first side of the substrate after metallizing the first side of the substrate and attaching a lid wafer to the first side of the substrate. The lid wafer may be comprised of glass.

Process flow for a method of manufacture is set forth with reference to FIGS. 9A-9K.

Figure 9A:
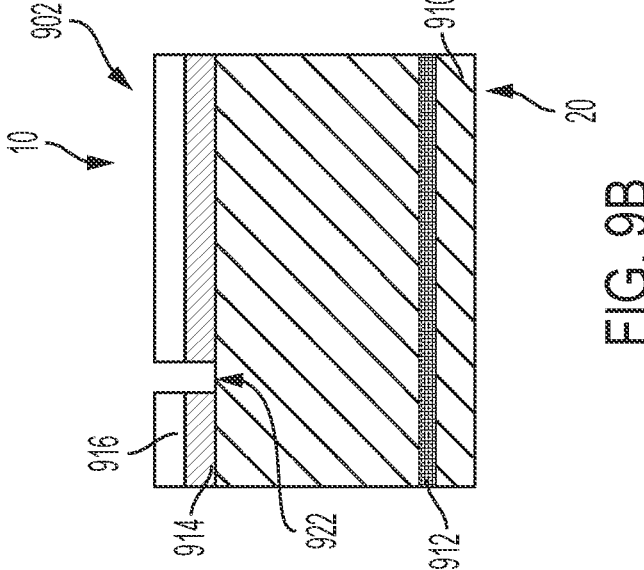

FIG. 9A illustrates a cross-section of a silicon wafer 902 (e.g., silicon on interface wafer) that may be chosen to be in the thickness range of 300-600 micrometers (um). The silicon wafer 902 may have a top side 10 (or device side or simply a top) and a backside or bottom side 20. Layers within the MEMS mirror array 100 formed from the silicon wafer 902 may have a layer top surface oriented towards top side 10 and a bottom surface oriented towards bottom side 20. The silicon wafer 902 is marked in the upper left hand portion of the figure. The buried oxide layer 912 may be 0.5-1 um thick and located 10-50 um beneath the top side 10.

FIGS. 9B-9E illustrate a process of fabricating the tensioning structure in accordance with some implementations of the present disclosure.

Although a number of variations for fabrication may be possible, the process in this example is shown in FIGS. 9B-9E as described in U.S. Pat. No. 6,239,473. The tensioning structure may be fabricated using a process that may be used to fabricate the isolation trench structure. The tensioning structure may be fully or partially embedded within a mechanical structure.

Figure 9B:
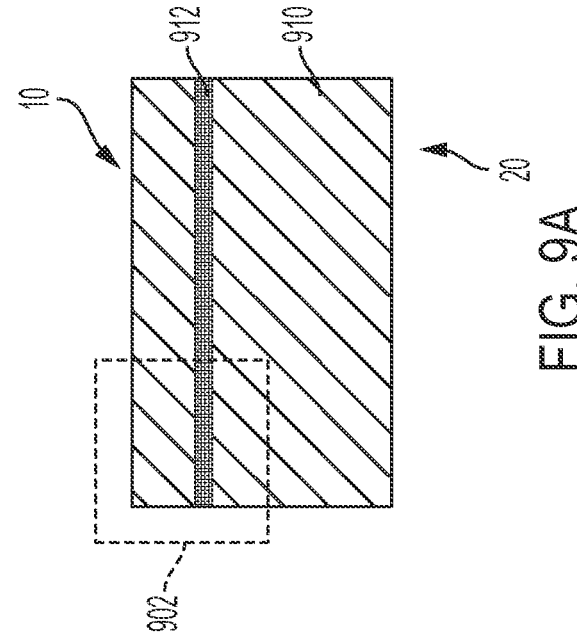

Referring to FIG. 9B, a silicon wafer 902 may be provided with a masking layer 914. The masking layer 914 may be silicon dioxide (e.g., an oxide layer). The silicon wafer 902 may be of arbitrary doping, resistivity, and crystal orientation because the process may depend on reactive ion etching to carve and form the structures. The masking layer 914 may protect the upper surface of the silicon wafer 902 during the trench etching process and may represent a masking layer. This masking layer 914 may be formed from any number of techniques, including thermal oxidation of silicon or chemical vapor deposition (CVD). The thickness of the masking layer 914 may be 0.5 $\mu$m-1.0 $\mu$m. A photoresist layer 916 may be spun onto the silicon wafer 902 and exposed and developed using photolithography techniques to define the trench pattern 922. Reactive ion etching may be used to transfer the photoresist pattern to the masking layer 914 to expose the top surface of the silicon wafer 902. Typically, the silicon dioxide mask may be etched in Freon gas mixture, for example $CHF_3$ or $CF_4$. High etch rates for silicon dioxide etching may be achieved using a high density plasma reactor, such as an inductively coupled plasma ("ICP") chamber. These ICP chambers use a high power RF source to sustain the high density plasma and a lower power RF bias on the wafer to achieve high etch rates at low ion energies. Oxide etch rates of 200 nm/min and selectivities to photoresist greater than 1:1 may be used for this hardware configuration.

Figure 9D:
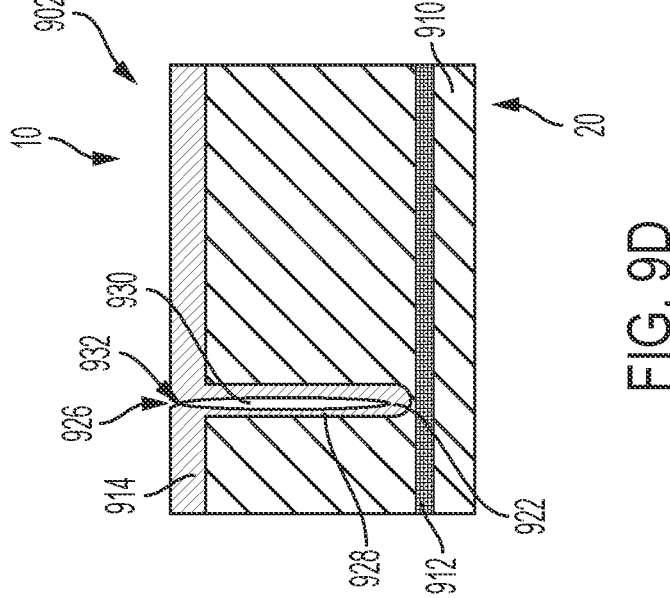
Figure 9C:
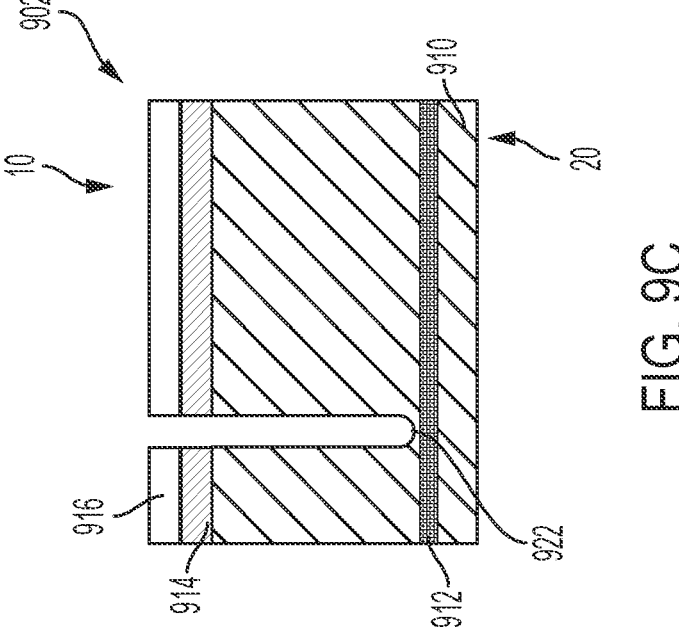

As illustrated in FIG. 9C, a trench 922 may be formed in the silicon wafer 902 by deep reactive ion etching of silicon using high etch rate, high selectivity etching. The trench may be etched in a high-density plasma using a sulfur hexafluoride ($SF_6$) gas mixture as described in U.S. Pat. No. 5,501,893. Preferably, etching may be controlled so that the trench 922 profile is reentrant, or tapered, with the top of the trench 922 being narrower than the bottom of the trench 922. Tapering of the trench 922 may allow suitable electrical isolation to be achieved in subsequent processing. Profile tapering may be achieved in reactive ion etching by tuning the degree of passivation, or by varying the parameters (power, gas flows, pressure) of the discharge during the etching process. Because the trench 922 may be filled with dielectric material, the opening at the top of the trench 922 may be less than 2 $\mu$m in width. The trench 922 depth may be in the range 10 $\mu$m-50 $\mu$m. A procedure for etching the trench 922 may be to alternate etch steps ($SF_6$ and argon mixture) with passivation steps (Freon with argon) in an ICP plasma to achieve etch rates in excess of 2 $\mu$m/min at high selectively to photoresist (>50:1) and oxide (>100:1). The power and time of the etch cycles may be increased as the trench deepens to achieve the tapered profile. Although the trench geometry may be reentrant, arbitrary trench profiles may be accommodated with adjustments in microstructure processing. Suitable results may be achieved with a number of trench etch chemistries. After the silicon trench has been etched, the photoresist layer 916 may be removed with wet chemistry or dry ashing techniques, and the masking layer 914 may be removed with a reactive ion etch ("RIE") or buffered hydrofluoric acid.

Referring to FIG. 9D, the trench 922 may be filled with an insulating dielectric material, e.g., silicon dioxide. The filling procedure may produce the mostly solid segment (e.g., $SiO_2$ layer discussed above) in the trench 922, and may deposit a masking layer 914 of dielectric material on the top side (top surface) of the silicon wafer 902 and dielectric layers on the sidewall 928 and bottom of the trench 922. The thickness of the deposited layer may be in excess of 1 μm. This fill may be accomplished with the oxidation of silicon at high temperatures. In thermal oxidation, the wafer may be exposed to an oxygen rich environment at temperatures from 900-1150° C. This oxidation process may consume silicon surfaces to form silicon dioxide. The resulting volumetric expansion from this process may cause the sidewalls of the trenches to encroach upon each other, eventually closing the trench opening. When at a high temperature, the newly formed oxide and silicon may be relatively stress free compared to room temperature. When the wafer returns to room temperature, the coefficient of thermal expansion mismatch between the silicon of the wafer and the silicon dioxide may produce a thermal stress. As the oxide has the lower coefficient of thermal expansion, it may tension the neighboring silicon which may decrease in size further if not attached to the oxide.

During the trench 922 filling process, trench profiles may be incompletely filled, which may cause an interface 932 and a void 930 to be formed in the trench 922. A local concentration of stress in the void 930 may cause electrical and mechanical malfunction for some devices, but may not impact other micromechanical devices due to the enclosed geometry of the trench 922. The interface 932 and void 930 may be eliminated by shaping the trench 922 to be wider at the trench opening located at the top of the trench 922 than the bottom of the trench 922. However, suitable electrical isolation may use additional tapering of the microstructure trench etch in the later operations. Another artifact of the trench filling process may be an indentation 926 that may be created in the surface of the dielectric 914 centered over the trench 922. This indentation may be used in various trench filling processes, and may be as deep as 0.5 μm, depending on the thickness of the deposition. To remove the indentation 926 the surface may be planarized to form a flat, or substantially flat, surface, as illustrated in FIG. 9E, for subsequent lithographic and deposition steps. Planarization may be performed either by chemical-mechanical polishing (CMP) or by depositing a viscous material, which may be photoresist, spin-on glass, or polyimide, and flowing the material to fill the indentation 926 to a smooth finish. During etchback of the viscous material, which may be the second step of planarization, the surface may be etched uniformly, including the filled indentation. Therefore, by removing part of the surface oxide layer, the indentation 926 may be removed to create a uniform thickness layer. For example, when the masking layer 914 is originally 2 μm in thickness, then planarization to remove the indentation 926 may leave a masking layer 914 having a final thickness of less than 1 μm. The top side 10 (upper surface) of silicon wafer 902 may be nearly free from imperfection and may be ready for further lithography and deposition.

Figure 9F:
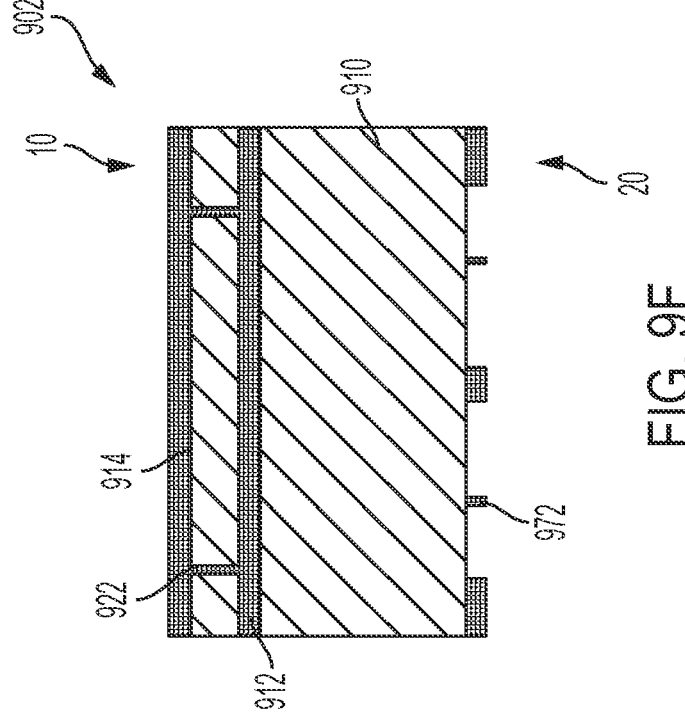
Figure 9E:
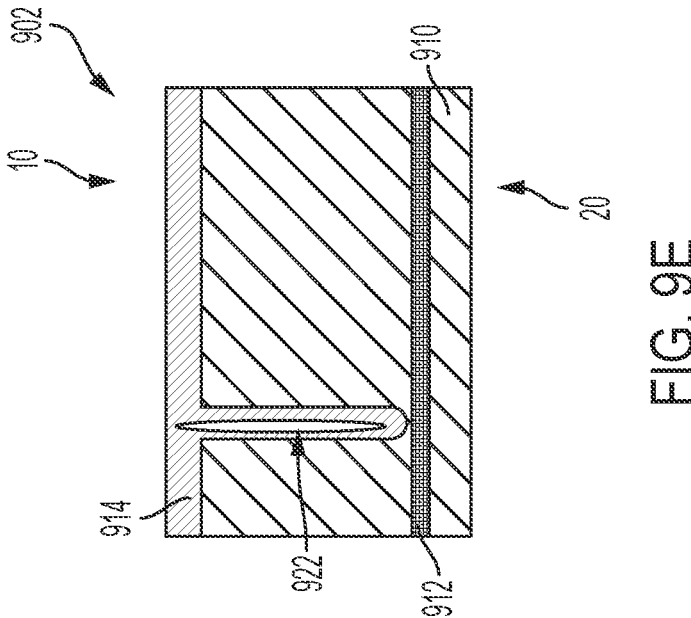

FIG. 9F shows silicon wafer 902 with masking layer 914 and isolation trenches 922. After the isolation trenches 922 are fabricated, front-to-back alignment may be used to lithographically pattern the masking layer for the blades on the bottom side 20 (backside) of the silicon wafer 902. The blade pattern 972 may be exposed and etched into a masking layer as isolation trench 922. The masking layer 914 may be a layer comprised of a combination of thermally grown silicon oxide and oxide deposited by chemical vapor deposition. It may also be comprised of a metal layer such as aluminum. The lithography pattern may be transferred in the masking layer by reactive ion etching, yet the silicon blade etching may not be completed until later in the process. Without the blades etched, the wafer may be easily processed through the remaining device layers. The backside of the blade pattern 972 may be typically aligned topside to the isolation trenches 922 to within several microns.

Figures 9G, 9H:
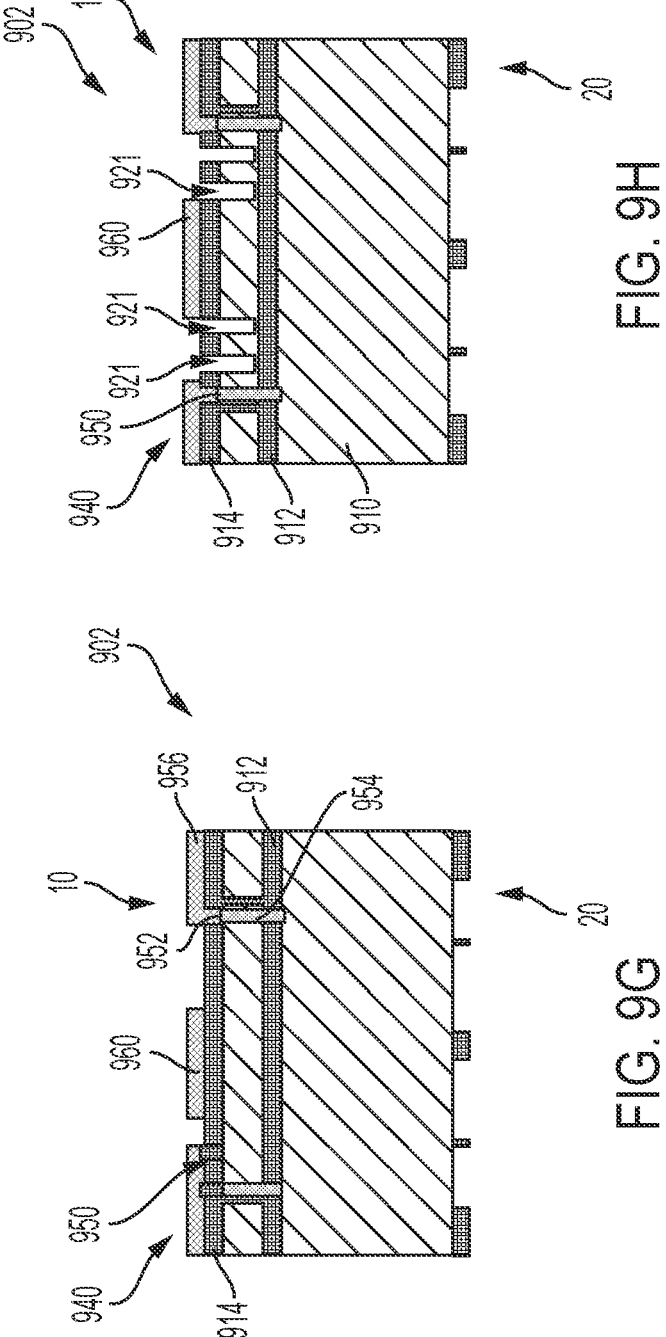

Metallization on the top side 10 of the silicon wafer 902 may proceed as illustrated in FIG. 9G. In order to make contact to the underlying silicon wafer 902 vias 950, 952 may be patterned and etched into the masking layer 914 using lithography and reactive ion etching. In some areas, the vias 954 may be etched through the buried oxide layer 912 and top silicon portion of 902 and vias 954 may be filled with polysilicon to produce polysilicon vias. After the vias 950, 952 are etched, metallization may be deposited to form a metal layer 940 and patterned to form a metal interconnect 956 to silicon wafer 902 through the via 952. For one example, the metal may be aluminum and may be patterned using wet etching techniques. In mirror arrays with high interconnect densities, patterning the metal using dry etching or evaporated metal lift-off techniques may achieve finer linewidths. The metal layer 940 may be used to provide bond pads and interconnects, which may connect electrical signals from control circuitry to a mirror to control mirror actuation.

Deposition of a second metal layer 960 may provide a reflective mirror surface. This metal may be tuned to provide high mirror reflectivities at the optical wavelengths of interest, and may be evaporated and patterned using lift-off techniques to allow a broader choice of metallization techniques. The metallization may be comprised of 500 nm of aluminum. However, additional metal stacks such as Cr/Pt/Au may be used to increase reflectivities in the wavelength bands common to fiber optics. Because the metals may be deposited under stress and may affect the eventual mirror flatness, reducing the thickness of the masking layer 914 in the region of the mirror may be accomplished through the use of dry etching of the underlying dielectric prior to evaporation.

In FIG. 9H, the topside processing may be completed. First, a passivation dielectric layer (not shown) may be applied to protect the metallization during subsequent processing. The passivation dielectric layer may be removed in the region of the bonding pads. Second, the mirror structure including frame, mirror, and supports may be defined using multiple etches that define trenches 921 separating the structural elements. The etches may be self-aligned and proceed through the various metal, dielectric, and silicon wafers 902. A further blanket deposition may be applied to the topside which passivates the sidewalls of the trenches 921 and prepares the topside for mechanical release.

Figures 9I, 9J:
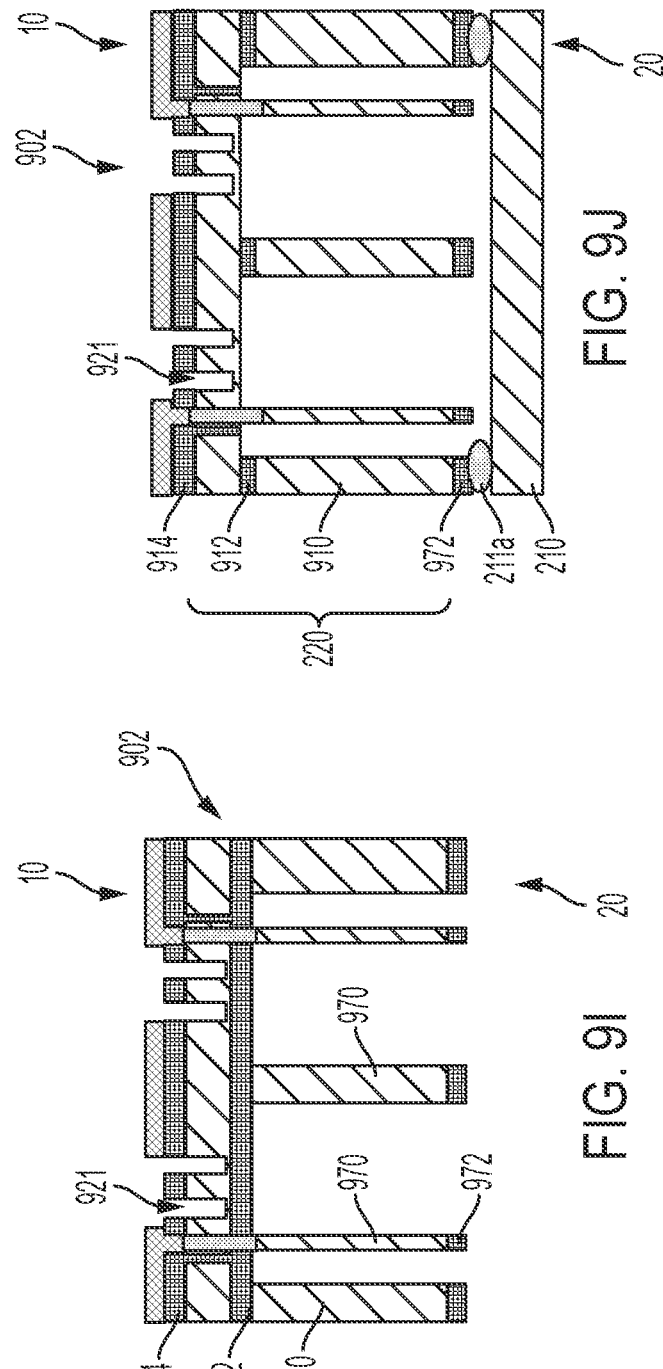

As shown in FIG. 9I, backside silicon etching may transfer the blade pattern 972 into the silicon wafer 902 substrate to obtain the blades 970. The etching may be performed using deep silicon etching at high selectivity to oxide using the techniques disclosed in U.S. Pat. No. 5,501, 893. The deep silicon etching achieves near vertical profiles in the blades 970, which may be nominally 5-20 um wide and in excess of 300 um deep. The etch stops on the buried oxide layer 912 to provide a uniform depth across the wafer while not punching through the top side 10 surface of the silicon wafer 902. Since the etch stops on the buried oxide layer 912, elongated members may not be used to remove etch depth variations across the device. Therefore, different patterns may be possible. Blades 970 may be etched simultaneously across the mirror element and across the mirror array. Buried oxide layer 912 may be etched at this time.

Referring to FIG. 9J, because the device wafer is now prepared for microstructure release, the device wafer 220 may become more susceptible to yield loss due to handling shock or air currents. In order facilitate handling and aid in hermetically sealing the mirror array, a silicon wafer 902 (or base wafer) may be bonded to the device wafer 220 to protect the blades after release. For one example, the bonding may be accomplished through the use of a bonding element 211a such as a frit glass material bonding element that may be heated to its flow temperature and then cooled. In this manner, a 400° C. temperature bonding elements 211a produces a hermetic seal to surround the mirror array. The separation between the device wafer 220 and the silicon wafer 210 using the bonding elements 211a such as a frit glass material bonding element, may allow the blades to swing through high rotation angles without impedance. Typically, the standoff may be greater than 25 um.

Figure 9K:
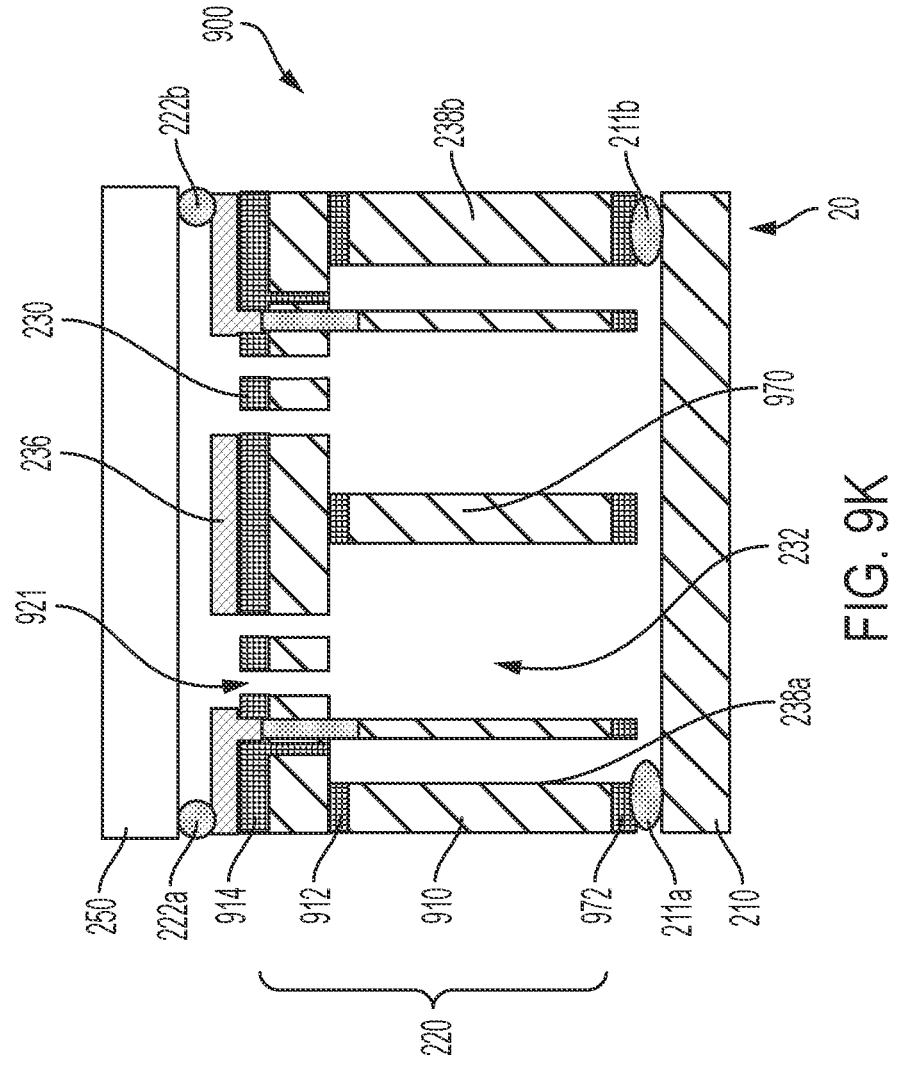

Final structure release is accomplished on the wafer topside in FIG. 9K using a combination of dry etching of silicon dioxide and silicon, which punctures through the trenches 921 to suspend the movable elements of the mirror 236 and the frame 230. In addition, the release etch promotes electrical isolation by separating, for example, the silicon of the frame 230 from the silicon of surrounding members 238a, 238b and device wafer 220. The vias 952 serve to connect the regions of silicon to the metal interconnects 956 (shown in FIG. 9G). To seal the mirrors from the outside environment, a lid wafer 250 is bonded to the device wafer 220, e.g., through the bonding elements 222a and 222b (e.g., frit glass seal) (e.g., as illustrated in FIG. 2). The lid wafer 250 is typically glass that allows incoming light to be transmitted with low loss in the mirror cavity 242 (e.g., as illustrated in FIG. 2), reflect off of the upper surface of the mirror 236, and transmit out of the mirror cavity 242 (e.g., as illustrated in FIG. 2).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that any claims presented define the scope of the invention and that methods and structures within the scope of these claims and their equivalents be covered thereby.

What is claimed:
1. A microelectromechanical (MEM) device, comprising:
a first stage comprising a first stage reflective surface;
a first frame pivotally coupled to the first stage;
a second frame coupled to the first frame;
one or more of
  second frame flexures positioned on the first frame and the second frame or first stage flexures positioned on the first stage; and
  a tensioning structure, wherein the tensioning structure is coupled to the first frame to facilitate an amount of tension in one or more of the second frame flexures or the first stage flexures to prevent buckling of the one or more of the second frame flexures or the first stage flexures,
  wherein the tensioning structure comprises a first portion on a first edge portion of the first frame, a second portion on a second edge portion of the first frame, and a third portion on a third edge portion of the first frame, and
  wherein a first distance between the first stage and one or more of the first portion or the second portion is greater than a second distance between the third portion and the first stage.
2. The MEM device of claim 1, wherein the tensioning structure comprises a material having a different coefficient of thermal expansion compared to one or more of the first stage or the first frame.
3. The MEM device of claim 1, wherein one or more of the first portion, the second portion, or the third portion of the tensioning structure is partially or fully embedded in the first frame.
4. The MEM device of claim 1, wherein the third portion of the tensioning structure is partially or fully embedded in the third edge portion of the first frame adjacent the first stage.
5. The MEM device of claim 1, wherein the first frame comprises one or more of: one or more apertures or one or more reduced width portions configured to facilitate the amount of tension.
6. The MEM device of claim 1, wherein the tensioning structure comprises a plurality of segments that are partially or fully embedded in the first frame.
7. The MEM device of claim 6, wherein at least one of the plurality of segments is substantially perpendicular to an edge of the first frame.
8. The MEM device of claim 1, wherein the tensioning structure comprises a plurality of segments that are spaced apart by a predetermined distance that is substantially uniform.
9. The MEM device of claim 1, wherein the tensioning structure comprises one or more of a zig-zag pattern or a sine-wave pattern.
10. The MEM device of claim 1, wherein the first portion of the tensioning structure is substantially parallel to the second portion of the tensioning structure.
11. The MEM device of claim 1, wherein the first portion of the tensioning structure extends substantially parallel to the first edge portion of the first frame.
12. The MEM device of claim 1, wherein a first length of the first portion of the tensioning structure is substantially equal to a second length of the second portion of the tensioning structure.
13. A method for facilitating tension in a microelectromechanical (MEM) device, comprising:
  coupling a moveable frame to a stage with a reflective surface, and a stationary frame; and
  embedding one or more tensioning structures in the moveable frame to facilitate an amount of tension in one or more flexures to prevent buckling of the one or more flexures,
  wherein the one or more tensioning structures comprise a first portion and a second portion, wherein the first portion is located at an edge portion of the moveable frame at less than a first distance to the stage and the second portion is located at the edge portion of the moveable frame at greater than the first distance to the stage.

14. The method of claim 13, further comprising: embedding a plurality of segments in the moveable frame.

15. The method of claim 13, wherein the one or more tensioning structures comprise one or more of a zig-zag pattern or a sine-wave pattern.

16. The method of claim 13, wherein the movable frame comprises one or more of: one or more apertures or one or more reduced width portions configured to facilitate the amount of tension.

17. The method of claim 13, wherein the first portion of the one or more tensioning structures is partially or fully embedded in the edge portion of the moveable frame adjacent the stage.

18. A method for fabricating a tensioning structure in a microelectromechanical (MEM) device comprising:

forming a layer of dielectric material on a first side of a substrate;

forming on the first side of the substrate one or more vertical isolation trenches containing dielectric material;

patterning a masking layer on a second side of the substrate that is opposite to the first side of the substrate;

forming vias on the first side of the substrate;

metallizing the first side of the substrate;

depositing a second metal layer on the first side of the substrate to form a reflective surface;

forming second trenches on the first side of the substrate to define structures;

deeply etching the second side of the substrate to form narrow blades;

bonding a base wafer to the second side of the substrate after forming the narrow blades; and etching through the second trenches on the first side of the substrate to release the structures and to provide electrical isolation, wherein the MEM device comprises a first stage comprising a first stage reflective surface; and a first frame pivotally coupled to the first stage, a second frame coupled to the first frame; and a tensioning structure, wherein the tensioning structure is coupled to the first frame to facilitate an amount of tension in one or more of second frame flexures or first stage flexures to prevent buckling of the one or more of the second frame flexures or the first stage flexures, wherein the tensioning structure comprises a first portion on a first edge portion of the first frame, a second portion on a second edge portion of the first frame, and a third portion on a third edge portion of the first frame, and wherein a first distance between the first stage and one or more of the first portion or the second portion is greater than a second distance between the third portion and the first stage.

19. The method of claim 18, wherein the substrate comprises a silicon wafer and the dielectric material is silicone dioxide, or wherein the tensioning structure comprises one or more of a zig-zag pattern or a sine-wave pattern.

20. A microelectromechanical (MEM) device, comprising:

a first stage comprising a first stage reflective surface;

a first frame pivotally coupled to the first stage;

a second frame coupled to the first frame;

one or more of second frame flexures positioned on the first frame and the second frame or first stage flexures positioned on the first stage; and a tensioning structure, wherein the tensioning structure is coupled to the first frame to facilitate an amount of tension in one or more of the second frame flexures or the first stage flexures to prevent buckling of the one or more of the second frame flexures or the first stage flexures, wherein the tensioning structure comprises one or more of a zig-zag pattern or a sine-wave pattern.

21. The MEM device of claim 20, wherein the tensioning structure comprises a material having a different coefficient of thermal expansion compared to one or more of the first stage or the first frame, wherein the tensioning structure is partially or fully embedded in the first frame, wherein the tensioning structure is partially or fully embedded in an edge portion of the first frame adjacent the first stage, wherein the tensioning structure comprises a first portion on a first edge portion of the first frame, a second portion on a second edge portion of the first frame, and a third portion on a third edge portion of the first frame, or wherein the first frame comprises one or more of: one or more apertures or one or more reduced width portions configured to facilitate the amount of tension.

22. The MEM device of claim 20, wherein the tensioning structure comprises a plurality of segments that are partially or fully embedded in the first frame.

23. The MEM device of claim 22, wherein at least one of the plurality of segment is substantially perpendicular to an edge of the first frame.

24. The MEM device of claim 20, wherein the tensioning structure comprises a plurality of segments that are spaced apart by a predetermined distance that is substantially uniform, wherein a first portion of the tensioning structure is substantially parallel to a second portion of the tensioning structure, wherein the tensioning structure is substantially parallel to an edge portion of the first frame, or wherein a first length of the first portion of the tensioning structure is substantially equal to a second length of the second portion of the tensioning structure.

25. A method for facilitating tension in a microelectromechanical (MEM) device, comprising:

coupling a moveable frame to a stage with a reflective surface, and a stationary frame; and embedding one or more tensioning structures in the moveable frame to facilitate an amount of tension in one or more flexures to prevent buckling of the one or more flexures, wherein the one or more tensioning structures comprise one or more of a zig-zag pattern or a sine-wave pattern.

26. The method of claim 25, further comprising:

embedding a plurality of segments in the moveable frame.

27. The method of claim 25, wherein the movable frame comprises one or more of: one or more apertures or one or more reduced width portions configured to facilitate the amount of tension, or wherein the one or more tensioning structures are partially or fully embedded in an edge portion of the moveable frame adjacent the stage.

28. A method for fabricating a tensioning structure in a microelectromechanical (MEM) device comprising:

forming a layer of dielectric material on a first side of a substrate;

forming on the first side of the substrate one or more vertical isolation trenches containing dielectric material;

patterning a masking layer on a second side of the substrate that is opposite to the first side of the substrate;

forming vias on the first side of the substrate;

metallizing the first side of the substrate;

depositing a second metal layer on the first side of the substrate to form a reflective surface;

forming second trenches on the first side of the substrate to define structures;

deeply etching the second side of the substrate to form narrow blades;

bonding a base wafer to the second side of the substrate after forming the narrow blades; and etching through the second trenches on the first side of the substrate to release the structures and to provide electrical isolation, wherein the MEM device comprises a first stage comprising a first stage reflective surface; and a first frame pivotally coupled to the first stage, a second frame coupled to the first frame; and a tensioning structure, wherein the tensioning structure is coupled to the first frame to facilitate an amount of tension in one or more of second frame flexures or first stage flexures to prevent buckling of the one or more of the second frame flexures or the first stage flexures, and wherein the tensioning structure comprises one or more of a zig-zag pattern or a sine-wave pattern.

29. The method of claim 28, wherein the substrate comprises a silicon wafer and the dielectric material is silicone dioxide.

\* \* \* \* \*